United States Patent [19]

LaFleur

[11] Patent Number: 5,389,724
[45] Date of Patent: Feb. 14, 1995

[54] POLYMER BLENDS

[75] Inventor: Edward E. LaFleur, Warminster, Pa.

[73] Assignee: Rohm and Haas Company, Philadelphia, Pa.

[21] Appl. No.: 261,788

[22] Filed: Jun. 20, 1994

Related U.S. Application Data

[63] Continuation-in-part of Ser. No. 171,036, Dec. 21, 1993, which is a continuation-in-part of Ser. No. 98,585, Jul. 28, 1993, which is a continuation-in-part of Ser. No. 988,548, Dec. 10, 1992, which is a continuation-in-part of Ser. No. 872,478, Apr. 23, 1992, abandoned.

[51] Int. Cl.$^6$ .................................... C08L 29/04
[52] U.S. Cl. ...................... 525/57; 525/221; 525/227; 525/240
[58] Field of Search .................. 525/57, 221, 227, 240

[56] References Cited

U.S. PATENT DOCUMENTS

| | | | |
|---|---|---|---|
| 2,509,857 | 5/1950 | Borcherdt et al. | 525/57 |
| 2,557,266 | 6/1951 | Dittmar et al. | 525/57 |
| 3,105,058 | 9/1963 | Osugi et al. | 260/45 |
| 3,418,202 | 12/1968 | Brunson et al. | 161/192 |
| 3,668,274 | 6/1972 | Owens et al. | 260/857 |
| 3,996,181 | 12/1976 | Hayashi et al. | 524/25 |
| 4,514,546 | 5/1985 | Rezu et al. | 525/57 |
| 4,575,532 | 3/1986 | Schmuckler et al. | 525/57 |
| 4,600,746 | 7/1986 | Schmuckler et al. | 525/57 |
| 4,618,648 | 10/1986 | Marten | 525/60 |
| 4,666,446 | 7/1986 | Schmuckler et al. | 525/57 |
| 4,678,832 | 7/1987 | Pospich et al. | 525/60 |
| 4,814,373 | 3/1989 | Frankel et al. | 524/460 |
| 4,874,824 | 10/1989 | Hallden-Abberton et al. | 525/379 |
| 5,010,134 | 4/1991 | Chiang et al. | 525/57 |
| 5,137,969 | 9/1992 | Marten et al. | 525/56 |
| 5,171,777 | 12/1992 | Kuphai et al. | 524/522 |
| 5,189,097 | 2/1993 | LaFleur et al. | 525/57 |
| 5,258,230 | 11/1993 | LaFleur et al. | 428/412 |

FOREIGN PATENT DOCUMENTS 470486 7/1991 European Pat. Off.
3112652 12/1991 European Pat. Off.

*Primary Examiner*—James J. Seidleck
*Assistant Examiner*—W. Robinson H. Clark
*Attorney, Agent, or Firm*—Roger K. Graham

[57] ABSTRACT

Polymers containing a high percentage of vinyl alcohol units may be melt-blended with copolymers of alkyl(meth)acrylates and unsaturated organic acids. Flexible films are formed when one of the methacrylic monomers is a monoterminally (meth)acrylated oligomer or polymer of ethylene glycol or propylene glycol.

3 Claims, No Drawings

POLYMER BLENDS

This application is a continuation-in-part of U.S. application Ser. No. 08/171,036, filed Dec. 21, 1993, which in turn is a continuation-in-part of U.S. application Ser. No. 08/98,585, filed Jul. 28, 1993, which in turn is a continuation-in-part of U.S. application Ser. No. 07/988,548, filed Dec. 10, 1992, which in turn is a continuation-in-part of U.S. application Ser. No. 07/872,478, filed Apr. 23, 1992, now abandoned.

FIELD OF THE INVENTION

This invention relates to blends, especially melt-processable blends, of polymers containing a high percentage of vinyl alcohol units blended with certain copolymers of alkyl methacrylates with unsaturated organic acids, such as methacrylic acid. It further relates to blends, especially melt-processed blends of these polymers in the form of sheet, film, fibers and other formed objects which exhibit a useful balance of barrier and strength properties, such as good resistance to permeation of gases, low moisture absorptivity, and toughness/modulus balance adequate for packaging uses.

BACKGROUND OF THE INVENTION

Of all the synthetic polymers considered as materials with useful gas permeation properties, such as resistance to passage of oxygen, carbon dioxide, water, and the like, poly(vinyl alcohol) (PVOH), a polymer made up of units of the structure

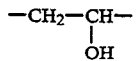

and generally prepared by the total hydrolysis of homopolymers of vinyl acetate or related vinyl esters, the starting polymer made up of units of the structure

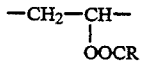

where R is alkyl, that is, from one to eight carbon atoms, preferably methyl, ranks as the most impervious to the passage of small molecules. PVOH exhibits this property because of the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded.

The above limitations were surmounted by the preparation and subsequent hydrolysis of vinyl acetate copolymers with monomers other than vinyl esters, especially copolymers with olefins, such as ethylene, propylene, butene-1, and the like. Hydrolysis of ethylene/vinyl acetate copolymers provides a polymer which exhibits those desirable characteristics of PVOH, but is superior to PVOH in performance in hydrophilic environments, such as wet strength, and in melt processability. However, these copolymers exhibit a significant increase in the permeability of the polymer to small molecules. Polymers having a low mol percentage of ethylene, such as from about 5 to about 25 mol percent, are similar to poly(vinyl alcohol) in that they cannot be melt-processed into film without the aid of plasticizers.

In order to render PVOH melt processable, steps have been taken to break up the crystallinity by the addition of external plasticizers. Amongst the best known plasticizers of PVOH are the polyols; these include polyethylene glycol, glycerol, and neopentyl glycol. The use of small molecules or oligomers as plasticizers for PVOH has its inherent limitations and disadvantages. The current state of the art technology employs 10–25 parts of plasticizer to 100 parts of PVOH. A higher concentration of plasticizer leads to phase separation and embrittlement of the plasticized matrix. Low levels of plasticizer, on the other hand, lead to the formation of highly viscous inextrudable melts during melt processing and extrusion. Another shortcoming of plasticized PVOH is the occurrence of plasticizer migration, which arises during thermal processing such as extrusion and heat sealing of PVOH film. During extrusion, the low molecular weight plasticizer may deposit at the die lips. During heat sealing, the low molecular weight plasticizer will migrate and evaporate from the heated region of the film. In the absence of the plasticizer, the PVOH rapidly recrystallizes and embrittles the heat sealed portion of the film. In a packaging application, this embrittlement can compromise the integrity of the package via cracks and pinholes. Another shortcoming of externally plasticized PVOH, which manifests itself when the plasticized PVOH resin comes into contact with alkaline or acidic solvents, is the hydrolysis and subsequent embrittlement of the partially hydrolyzed PVOH resin that is frequently used in preparing plasticized PVOH material.

Preparation of internally plasticized PVOH resin by polymerization of vinyl acetate in the presence of a plasticizer or second polymer has been studied to overcome the above difficulties, but such polymerizations, especially in emulsion, offer limitations caused by the difficulty of dispersing the plasticizer or pre-formed second polymer where it is intimately admixed with the polymerizing vinyl ester, which has a significant degree of water solubility.

In spite of the fact that all of the above mentioned techniques have the effect of improving the melt processing characteristics of PVOH, they also have the concomitant effects of significantly increasing the permeability of the resin to small molecules and reducing the stiffness and heat distortion temperature of the resin. Thus there exists a need for a means to allow melt-processing of polymers of high vinyl alcohol content, such as fully hydrolyzed or highly hydrolyzed polymers of vinyl esters, into useful objects maintaining most of the barrier properties of the polymer of high vinyl alcohol content. There further exists a need for additive polymers which may be blended with polymers of high vinyl alcohol content to enhance their ability to form films and coatings with improved properties of the film or coating without much loss in barrier properties.

In U.S. patent application Ser. No. 07/781,715 now U.S. Pat. No. 5,189,097, which has the same inventors and the same assignment as the present application, are disclosed additive polymers useful in allowing melt processing of the poly(vinyl alcohol) materials discussed above without significant alteration of their physical and barrier properties. These additive polymers are copolymers of lower alkyl methacrylates with a variety of nitrogenous monomers, especially those bearing amide groups, and most especially N-vinylpyrrolidone. Further is disclosed as more useful additives terpolymers containing lower alkyl methacrylates, the same nitrogenous co-monomers, and copolymerized unsaturated carboxylic acids, such as methacrylic acid. It is further disclosed that these latter terpolymers form segmented copolymers on blending with the poly(vinyl alcohol) matrix polymers.

The polymers of application Ser. No. 781,715 do require nitrogenous monomers, which adds to the cost, which are somewhat difficult to incorporate effectively by emulsion copolymerization, and which may contribute color to the resulting blends. For these and other reasons, it would be desirable to remove the nitrogenous monomers if similar results in blends with poly(vinyl alcohol) can be retained.

In U.S. Pat. No. 5,010,134, Chiang et al. disclose graft copolymers of poly(vinyl alcohol) with copolymers of 30–90 mol % methyl methacrylate and 10–70 mol % maleic anhydride, which graft copolymers are insolubilized upon heating to the processing temperatures of the present invention, so that the blends are not useful as thermoplastics, and are not melt-processable.

SUMMARY OF THE INVENTION

As is well known in the polymer art, polymers differ in chemical structure from the monomers from which they are made. One can refer to a polymer of methyl methacrylate or poly(ethylene glycol terephthalate), but it is not exactly correct to refer to a polymer containing methyl methacrylate or a polymer containing ethylene glycol and terephthalic acid. Thus we have chosen to use the term "units derived from", such as a polymer containing units derived front methyl methacrylate or units derived from an aliphatic diol and an aromatic dicarboxylic acid. It is believed that this accurately represents the composition of the polymer which otherwise requires a complicated IUPAC nomenclature or a series of formulas.

We have found a melt-processable polymeric blend comprising:

a) from about 70 to about 98 parts of a first polymer containing at least about 50 mol percent of units of the structure

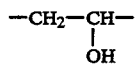

and optionally units of the structure

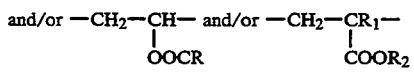

wherein R is alkyl, that is, of one to eight carbon atoms, $R_1$ is H or $CH_3$, and $R_2$ is an alkyleneoxy or a $C_1$ to $C_4$ alkyl group, such as ethyl, methyl, n-butyl, iso-butyl, and the like; and b) from about 2 to about 30 parts of a second polymer containing from about 75 to about 98 weight percent of units of the structure

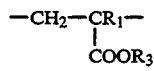

where $R_3$ is lower alkyl of front 1 to 4 carbon atoms such as methyl, ethyl, propyl, or butyl, and from about 2 parts to about 25 parts of units derived from an unsaturated copolymerizable unsaturated acid, the acid preferably of the structure $CHR_4=CHR_4$ and/or $CH_2=CR_1R_4$ and/or

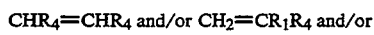

and/or $CH_2=CR_1-COO-CH_2-CH_2R_4$ where $R_4$ is —COOH.

In one desired component of the invention, the polymeric blend is one wherein the first polymer comprises at least about 95 mol, more preferably about 99, mol percent of units of the structure

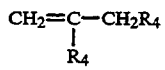

and where the second polymer comprises from about 80 to about 90 weight percent of units of the structure

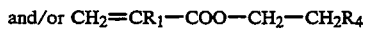

where $R_1$ and $R_3$ are —$CH_3$. This is desired because of the best balance of processing and properties of the blends.

If an alkeneoxy group is present, it is preferred the alkeneoxy group contain from 1 to about 20 alkeneoxy units and terminate in hydrogen, a $C_1$-$C_{20}$ alkyl, $C_6$ aryl, or $C_7$-$C_{20}$ alkaryl group.

We have found that a carboxylic acid anhydride unit formed in situ in a polymer mainly of lower alkyl methacrylate units will also impart thermoprocessable properties to the poly(vinyl alcohol). Specifically, poly(methyl methacrylate) can be treated by the method of Hallden-Abberton, et al., U.S. Pat. No. 4,874,824, with dimethylamine in an extruder to form a polymer containing from about 2 to about 25 weight percent of glutaric anhydride units, i.e.

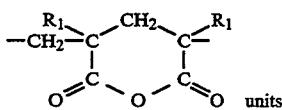 units

The resulting copolymer may be combined at levels of from about 2 to about 30 parts of the glutaric anhydride units with from 70 to 98 parts of the above-listed poly(vinyl alcohol) homo- and copolymers to form a melt-processable blend.

It has also been discovered that styrene polymers containing acid and/or anhydride functionality may also be utilized to modify favorably the melt processing of poly(vinyl alcohol). More specifically, we have discovered a melt-processable polymeric blend comprising:

a) from about 80 to about 98 parts of a first polymer containing at least about 50 mol % units of the structure

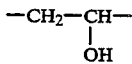

and optionally units selected from one or more of the following structures:

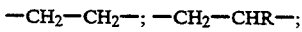

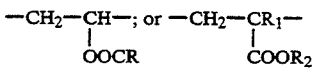

wherein R is alkyl, $R_1$ is H or $CH_3$, and $R_2$ is an alkyleneoxy group; and b) from about 2 to about 20 parts of a second polymer containing from about 60 to about 98 weight percent of units of the structure

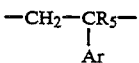

where Ar is aryl, halogen-substituted aryl, or alkyl-substituted aryl, and where $R_5$ is —H or —$CH_3$ and from about 2 to about 15 weight percent of units derived from an unsaturated copolymerizable carboxylic acid or anhydride. The second polymer may further contain up to about 25 weight percent of methacrylonitrile or acrylonitrile. Such polymers include copolymers of styrene/maleic acid, styrene/maleic anhydride, styrene/methacrylic acid, styrene/α-methylstyrene/acrylic acid, styrene/α-methylstyrene/methyl methacrylate/methacrylic acid, styrene/methyl methacrylate/methacrylic acid, styrene/citraconic acid, styrene/butadiene/methacrylic acid, styrene/acrylic acid/maleic anhydride, and the like.

Although not a carboxylic acid, copolymers of an unsaturated sulfonic acid with vinyl aromatic monomers may be employed, such as a copolymer of styrene with styrene sulfonic acid.

We have also found that useful articles may be made from these blends, when they are processed in the form of a foil, sheet, film, fiber, packaging material, multilayer laminate, or molded article.

We have also found that some chemical interaction between the components occurs during the blending/processing operation, and so we have discovered a melt-processable thermoplastic segmented polymer comprising from about 70 to about 98 parts of at least one segment of a first polymer containing at least 50 mol percent units of the structure

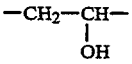

and optionally units of the structure

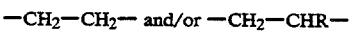

-continued

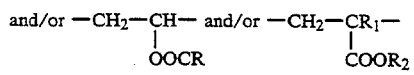

wherein R is alkyl, $R_1$ is H or $CH_3$, and $R_2$ is an alkyleneoxy group; and chemically joined thereto from about 2 to about 30 parts of at least one segment of a second polymer containing from about 75 to about 98 weight percent of units of the structure

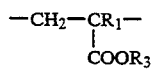

where $R_3$ is lower alkyl, and from about 2 to about 25 weight percent of units derived from an unsaturated copolymerizable carboxylic acid or anhydride. A preferred composition is one wherein at least one first polymer segment contains more than about 85 mol percent of units of the structure

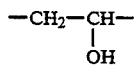

and wherein at least one first polymer segment is from about 70 to about 90 parts by weight of the segmented polymer. This composition is preferred because of the best balance of processing and properties of the of the segmented copolymer.

DETAILED DESCRIPTION OF THE INVENTION

The blends of the vinyl alcohol polymers and the (meth)acrylate/copolymerized acid polymers may be formed into useful objects by many techniques, including casting from solution, compression molding of powder blends, formation of films and sheets from mixtures of latices and water-soluble polymers, extrusion of melt blends, and the like. The scope of the invention is not limited by the means of processing.

However, the major advantage of the invention is that the blends can be melt-processed under practical conditions under which the vinyl alcohol alone is non-processable. By melt-processable is meant that the polymer or blend can be converted from a solid form such as pellets, powder, and the like into a thermoplastic viscoelastic melt within an extruder or other heating/mixing device, that the melt is thermally stable enough to resist thermal degradation, and that the melt can be processed by extrusion, calendering, laminating, molding and the like into useful objects. The melt will neither be so liquid that it cannot be contained within the extruder or cannot be issued from the extruder in solid form, nor will it be so viscous that the extruder is incapable of processing it without damage to the equipment, nor will it be so thermally unstable that degradation will spoil the appearance or physical properties of objects processed from the melt. Further, the melt and resulting extrudate must be uniform in appearance. Further, thermoplastic implies that the material may be re-processed by a similar operation into useful objects having about the same physical and chemical properties as those obtained from the first thermoplastic processing of the blend.

The first polymer of the blend, which we shall designate PVOH, is a homopolymer or a copolymer of "vinyl alcohol" and a vinyl ester. Vinyl alcohol does not exist in monomeric form, and polymers containing such units must perforce be derived by chemical alteration of polymers derived from another monomer. The most common means of preparing such polymers is to polymerize a vinyl ester, such as vinyl formate, vinyl acetate, and the like of the structure $$-CH_2-CH-$$
$$\phantom{-CH_2-}|$$
$$\phantom{-CH_2-}OOCR$$

where R is H or alkyl, which we define as aliphatic carbon chains of from 1 to 20 carbons, preferably 1 to 8, and most preferably 1, the chains being linear, branched, or cyclic. Thus, most preferred is vinyl acetate, where R is —$CH_3$. Such polymers may be almost completely saponified or hydrolyzed to form polymers of greater than 99 mol % "vinyl alcohol". A small number of units derived from the unhydrolyzed vinyl ester may be present. By controlling the conditions of hydrolysis or saponification, copolymers of the vinyl ester and vinyl alcohol may be formed. A range of such compositions are commercially available. The range of front about 50 mol % to about 100 mol % of vinyl alcohol is encompassed in the invention. Other co-monomers may be present in the first polymer, but at low molar levels, such as below about 10 mol %. Such co-monomers may include (meth)acrylic esters, such as alkyl esters, such as ethyl acrylate, butyl methacrylate, and the like, hydroxyalkyl (meth)acrylates, such as beta-hydroxyethyl methacrylate, and the like, olefins, such as ethylene, propylene, butene-1 and the like, vinyl halides, such as vinyl chloride, N-vinyllactams, maleic anhydride, dialkyl maleates, dialkyl fumarates, and the like. Of the olefins which may be copolymerized, having the formula $$CH_2=CHR \text{ or } CH_2=CH_2$$

it is preferred that ethylene be used. As noted, most commercial copolymers of ethylene and vinyl alcohol, having a relatively low mol % of vinyl alcohol content and diminished barrier properties, are unsuitable for the purposes of the present invention; however, copolymers of from about 5 to about 25 mol percent ethylene, preferably from about 5 to about 15 mol percent, may be melt-processed when blended with the copolymers of lower alkyl (meth)acrylates disclosed herein.

The partially or totally hydrolyzed PVOH which may be employed in this invention possess a molecular weight (weight average) between 13,000 and 2,000,000, but preferably between 31,000 and 50,000 since in this molecular weight range the PVOH processes more readily in the presence of the additive polymer. The viscosity of these two ranges of average molecular weights may also be measured in solution, and will vary from 3–50 cPs (4% aqueous solutions, 20° C.), preferably between 22–26 cPs. If PVOH of a higher degree of saponification (87–99.9 mol %) is utilized, the PVOH polymer may be of higher molecular weight, to as high as about 2,000,000.

The first polymer may also contain units derived from alkyleneoxy (meth)acrylates, such as are described in U.S. Pat. No. 4,618,648, incorporated herein by reference. Such alkyleneoxy (meth)acrylates are esters of (meth)acrylic acid having as the "alcohol" portion oligomers of —$CH_2$—CHY—O— units, where Y is hydrogen or methyl, and are derived from oligomerization of ethylene and/or propylene oxide. They may be terminated at one end by alkyl, aryl, or alkaryl groups, such as $C_1$-$C_{20}$ alkyl, $C_6$ aryl or $C_7$-$C_{20}$ alkaryl group. The formula may be expressed as $$-CH_2-CR_1-$$
$$\phantom{-CH_2-}|$$
$$\phantom{-CH_2-}COOR_3$$

where $R_1$ and $R_3$ are as defined above.

The second component of the melt-processable blend is a polymer which is a copolymer of from about 75 to 98 parts of a $C_1$ to $C_4$ alkyl ester of acrylic or methacrylic acid, preferably the $C_1$ ester of methacrylic acid, which is methyl methacrylate, with from about 2 to about 25 parts of an unsaturated copolymerizable carboxylic acid, the acid preferably of the structure $$CHR_4=CHR_4; CH_2=CR_1R_4;$$

$$CH_2=C-CH_2R_4; \text{ or}$$
$$\phantom{CH_2=}|$$
$$\phantom{CH_2=}R_4$$

$$CH_2=CR_1-COO-CH_2-CH_2R_4,$$

where $R_4$ is —COOH. Such acids include acrylic acid, methacrylic acid, maleic acid, fumaric acid, maleic anhydride, itaconic acid, monoalkyl maleates, monoalkyl fumarates, monoalkyl itaconates, acryloxypropionic acid, and the like. Acids such as vinylbenzoic acid, allyloxyacetic acid, and the like may also be employed. Copolymerizable anhydrides, such as maleic anhydride and itaconic anhydride are also effective in the practice of the invention. Acid/anhydride groups from postpolymerization reactions may also be used, such as acid groups introduced by the pyrolysis to t-butyl esters, such as those of units derived from t-butyl methacrylate, or by treating an ester-containing polymer with dimethylamine, as taught in Hallden-Abberton, U.S. Pat. No. 4,874,824. Of the acids, especially preferred for cost and ease of incorporation is methacrylic acid.

Other monomers may be copolymerized with those listed above which comprise the second copolymer, as long as they do not adversely affect either the copolymerization behavior, the processing of the blends, or the physical properties of the blend. Such monomers include up to about 10 parts of vinyl esters, such as vinyl acetate, vinyl aromatics, such as styrene, other esters of (meth)acrylic acid, such as glycidyl methacrylate, 2-ethylhexyl acrylate, and the like, (meth)acrylonitrile, and the like.

It is particularly useful to employ a second polymer containing
(i) from about 70 to about 93 weight percent of one or more units of the structure $$-CH_2-CR_1-$$
$$\phantom{-CH_2-}|$$
$$\phantom{-CH_2-}COOR_3$$

where $R_3$ is lower alkyl of from 1 to 4 carbon atoms, and
(ii) from about 2 to about 10 weight percent of one or more units derived from an unsaturated copolymerizable carboxylic acid or anhydride, wherein the second polymer contains no units derived from a vinyl amide or vinyl cyclic amide monomer, and wherein the second polymer further contains from 5 to 28 weight percent of units derived from at least one of

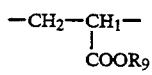 (a)

wherein $R_9$ is an alkyl group of 5 to 20 carbon atoms,

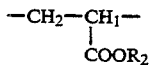 (b)

wherein $R_2$ is an alkeneoxy group, i.e., of the structure

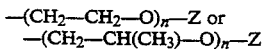

where n is from 1 to 30, and Z is H or $C_1$ to $C_8$ alkyl, (c) a vinyl ester, such as vinyl acetate, a vinyl aromatic, such as styrene, a functionalized (meth)acrylate ester, such as glycidyl methacrylate, or a nitrile-containing monomer, such as acrylonitrile or methacrylonitrile.

Preferred is a copolymer containing poly(ethylene glycol)-based side chains of MW 100 to 1000 attached to meth)acrylic unsaturation, that is where $R_1$ is preferably methyl, n is 4 to 20, and Z is H. (A poly(ethylene glycol) of MW 100 contains ca. 2.3 ethylene oxide units, so the preferred molecular weight of the side chain is ca. 200 to ca. 1000.) These side chains appear to act somewhat like a polymeric plasticizer, even at their low concentration in the overall blend, and allow both processing of the PVOH with the concomitant advantage of improving thermal stability. Further, these specific second polymers improve certain properties of the blend, such as reducing brittleness or crinkling noises from an extruded melt-processed blend. Films from such blends are therefore more attractive to the user of such films for packaging or wrapping purposes.

Although the second polymer is predominantly comprised of (meth)acrylic esters, low levels (from 5 to 28 weight percent of other co-monomers, such as a vinyl ester, such as vinyl acetate, a vinyl aromatic monomer, such as styrene, a functionalized monomer, such as glycidyl methacrylate, or a nitrile-containing monomer, such as acrylonitrile or methacrylonitrile, may be present without significantly affecting the ability of the second polymer to form with poly(vinyl alcohol) a melt-processed blend.

It is possible to use the acid- or anhydride containing polymer in the form of a multi-stage or core/shell polymer. Such polymers are well-known as impact modifiers for a variety of matrix polar plastics, especially when the matrix polymer contains groups to bond with the acid or anhydride. Thus polymers such as taught by Owens et al., U.S. Pat. No. 3,668,247, are useful in thermoprocessable blends of the present invention.

More specifically, the invention encompasses a melt-processable polymeric blend comprising:
a) from about 80 to about 98 parts of a first polymer containing at least about 50 mol % units of the structure

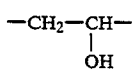

and optionally units selected from one or more of the following structures:

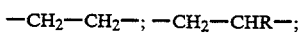

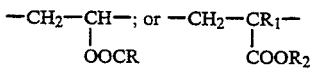

wherein R is alkyl, $R_1$ is H or $CH_3$, and $R_2$ is an alkyleneoxy group; and
b) from about 2 to about 20 parts of a second, core/shell, polymer comprising:
1. a rubbery cross-linked core polymer which contains greater than 75 weight percent, based on total weight of the core, of butadiene and/or one or more $C_2$-$C_8$ alkyl esters of acrylic acid;
2. a shell polymer containing from about 90 to about 98 weight percent of units of the structure

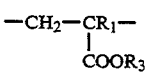

where $R_1$ is $CH_3$, and $R_3$ is $C_1$-$C_4$ lower alkyl, and from about 2 to about 10 weight percent of units derived from an unsaturated copolymerizable carboxylic acid or anhydride. Preferred are such compositions wherein the core polymer is at least 60% by weight of the core/shell polymer, and wherein the optional unit of the first polymer is

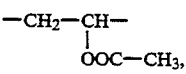

$R_1$ and $R_3$ are —$CH_3$, $R_5$ is —H and the unsaturated copolymerizable unsaturated acid has one of the following structures:

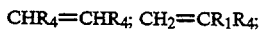

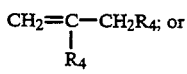

where $R_4$ is —COOH. Especially preferred is wherein the first polymer comprises at least about 95 mol percent, preferably greater than about 98% of units of the structure

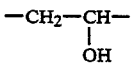

and wherein the second polymer comprises from about 2 to about 10 weight percent of units derived from the unsaturated carboxylic acid of the structure $CH_2=C(CH_3)R_4$.

Such blends may be prepared in the form of a foil, sheet, film, fiber, packaging material, multi-layer laminate or molded article.

It appears that such acid-containing methacrylic ester polymers, when polymerized in the presence of a polyolefin, are ineffective in forming a melt-processable blend with poly(vinyl alcohol).

It is also possible to use the acid- or anhydride containing vinyl aromatic polymer in the form of a multistage or core/shell polymer. More specifically, the invention encompasses a melt-processable polymeric blend comprising:

a) from about 80 to about 98 parts of a first polymer containing at least about 50 mol % units of the structure $$-CH_2-\underset{\underset{OH}{|}}{CH}-$$

and optionally units selected from one or more of the following structures:

$$-CH_2-CH_2-;\ -CH_2-CHR-;$$

$$-CH_2-\underset{\underset{OOCR}{|}}{CH}-;\ \text{or}\ -CH_2-\underset{\underset{COOR_2}{|}}{CR_1}-$$

wherein R is alkyl, $R_1$ is H or $CH_3$, and $R_2$ is an alkyleneoxy group; and b) from about 2 to about 20 parts of a second, core/shell, polymer comprising:
1. a rubbery cross-linked core polymer which contains greater than 75 weight percent, based on total weight of the core, of butadiene and/or one or more $C_2$–$C_8$ alkyl esters of acrylic acid;
2. a shell polymer containing from about 50 to about 98 weight percent of units of the structure $$-CH_2-\underset{\underset{Ar}{|}}{CR_5}-$$

where Ar is aryl, halogen-substituted aryl, or alkyl-substituted aryl, where $R_5$ is —H or —$CH_3$, optionally up to about 30 weight percent of units derived from (meth)acrylonitrile, and from about 2 to about 25 weight percent of units derived from an unsaturated copolymerizable carboxylic acid or anhydride.

It appears that such acid-containing vinyl aromatic polymers, when polymerized in the presence of a polyolefin, are ineffective in forming a melt-processable blend with poly(vinyl alcohol).

We further envisage a melt-processable polymeric blend comprising:

from about 80 to about 98 parts of a first polymer containing at least about 50 mol % units of the structure $$-CH_2-\underset{\underset{OH}{|}}{CH}-$$

and optionally units selected from one or more of the following structures:

$$-CH_2-CH_2-;\ -CH_2-CHR-;$$

$$-CH_2-\underset{\underset{OOCR}{|}}{CH}-;\ \text{or}\ -CH_2-\underset{\underset{COOR_2}{|}}{CR_1}-$$

wherein R is alkyl, $R_1$ is H or $CH_3$, and $R_2$ is an alkyleneoxy group; and from about 2 to about 20 parts of a second, multi-stage, polymer comprising:
1. a rubbery cross-linked first stage polymer which contains greater than 75 weight percent, based on total weight of the first stage of butadiene and/or one or more $C_2$–$C_8$ alkyl esters of acrylic acid, the first stage polymer further containing from about 0.5 to about 5 weight percent, of units derived from an unsaturated carboxylic acid;
2. a second-stage polymer containing from about 50 to about 100 weight percent of units of at least one of the structures $$-CH_2-\underset{\underset{COOR_5}{|}}{CR_1}-\ \text{or}$$

$$-CH_2-\underset{\underset{Ar}{|}}{CR_5}-$$

where Ar is aryl, halogen-substituted aryl, or alkyl-substituted aryl, where $R_5$ is —H or —$CH_3$, and optionally up to about 10 weight percent of units derived from an unsaturated carboxylic acid.

Such polymers are not necessarily core/shell polymers, as the second stage may be as domains included in the first stage, similar in morphology to polymers described in U.S. Pat. No. 4,184,373.

These multi-stage polymers, especially when an alkyl acrylate is in the first stage and a vinyl aromatic monomer in the second stage, when combined with poly(vinyl alcohol) and with additive polymers which are copolymers of an alkyl methacrylate and an anhydride or carboxylic acid, or preferably, with an additive terpolymer of an alkyl methacrylate, a monomer containing lactam or amide functionality and an acid group, give a ternary blend which exhibits melt processability and improved tensile strength and toughness.

The preferred additive terpolymer is a methyl methacrylate/N-vinyl pyrrolidone/methacrylic acid terpolymer. Such polymers are described in allowed U.S. patent application Ser. No. 781,715, herein incorporated by reference.

Thus, we envisage a melt-processable ternary polymeric blend comprising:

from about 55 to about 90 parts of a first polymer containing at least about 50 mol % units of the structure $$-CH_2-\underset{\underset{OH}{|}}{CH}-$$

and optionally units selected from one or more of the following structures:

$-CH_2-CH_2-$; $-CH_2-CHR-$;

$-CH_2-CH-$; or $-CH_2-CR_1-$
　　　|　　　　　　　　　|
　　OOCR　　　　　　COOR$_2$ wherein R is alkyl, $R_1$ is H or $CH_3$, and $R_2$ is an alkyleneoxy group; from about 5 to about 30 parts of a second, multi-stage, polymer comprising:

1. a rubbery cross-linked first stage polymer which contains greater than 75 weight percent, based on total weight of the first stage, of butadiene and/or one or more $C_2$-$C_8$ alkyl esters of acrylic acid, the first stage polymer further containing from about 0.5 to about 5 weight percent, of units derived from an unsaturated carboxylic acid;
2. a second-stage polymer containing from about 50 to about 100 weight percent of units of at least one of the structures $-CH_2-CR_1-$ or
　　　|
　　COOR$_5$ $-CH_2-CR_5-$
　　　|
　　Ar where Ar is aryl, halogen-substituted aryl, or alkyl-substituted aryl, where $R_5$ is —H or —$CH_3$, and optionally up to about 10 weight percent of units derived from an unsaturated carboxylic acid; and from about 5 to about 15 parts of a third polymer containing from about 5 to about 25 weight percent of units of the structure $-CH_2-CH-$　　or　$-CH_2-CH-$　or
　　　|　　　　　　　　　　|
　　　N　　　　　　　　　NH
　　／　＼　　　　　　　　|
(CH$_2$)$_n$——C=O　　　　O=C—R $\quad\quad R_1$　　　　　　　$\quad\quad R_3$
$\quad\quad |$　　　　　　　　$\quad\quad |$
$-CH_2-C-$　or $-CH_2-C-$
$\quad\quad |$　　　　　　　　$\quad\quad |$
$\quad\quad O=C-NR_6R_7$　　$O=C-O-CH_2-CH_2-R_8$ or $\quad\quad R_1$
$\quad\quad |$
$-CH_2-C-$
$\quad\quad |$
$\quad\quad O=C-NR_4-CH_2-CH_2-R_8$ wherein n is 2, 3, 4, or 5, $R_6$ and $R_7$ may be the same or different and are H, $C_1$-$C_4$ alkyl, or —$C_2H_4$—(O—$C_2H_4$)— in a cyclic form, and where $R_8$ is a urea or cyclic ureido structure of the formula

—NH—CO—NHR$_1$ or

—N—CO—NH
　|　　　　　|
　CH$_2$——CH$_2$ from about 94 to about 4 weight percent of units of the structure $\quad\quad R_3$
$\quad\quad |$
$-CH_2-C-$
$\quad\quad |$
$\quad\quad O=C-O-R_2$ wherein $R_2$ is $C_1$-$C_4$ alkyl; and from about 1 to about 10 weight percent of a copolymerizable unsaturated acid, anhydride or glycidyl-containing ester.

It is further possible to modify the poly(vinyl alcohol)polymers to make them melt-processable by preparing blends with acid- or anhydride-containing polymers which are copolymers with other vinyl or vinylidene divinyl monomers.

Thus, we envision a melt-processable polymeric blend comprising:

a) from about 80 to about 98 parts of a first polymer containing at least about 50 mol % units of the structure $-CH_2-CH-$
　　　|
　　OH and optionally units selected from one or more of the following structures:

$-CH_2-CH_2-$; $-CH_2-CHR-$;

$-CH_2-CH-$; or $-CH_2-CR_1-$
　　　|　　　　　　　　　|
　　OOCR　　　　　　COOR$_2$ wherein R is alkyl, $R_1$ is H or $CH_3$, and $R_2$ is an alkyleneoxy group; and b) from about 2 to about 20 parts of a second polymer containing from about 60 to about 98 weight percent of units of the structures $CH_2=CR_1CN$;

$CH_2=CHCl$;

$CH_2=C(Cl)_2$;

$CH_2=CH-O-C(O)R$;

$CH_2=CH-O-R$;

$CH_2=CH-Pyr$;

$CH_2=CR_1R_5$;

$CH_2=C(Cl)-CH=CH_2$;

or $CH_2=CH-CR_1=CH_2$ where Pyr is pyridinyl or alkyl-substituted pyridinyl, and from about 2 to about 15 weight percent of units derived from an unsaturated copolymerizable carboxylic acid or anhydride. Such monomers include copolymers containing one or more of such monomers as isobutylene, ethylene, propylene, chloroprene, butadiene, isoprene, (meth)acrylonitrile, vinyl chloride, vinylidene chloride, vinyl esters, such as vinyl acetate, vinyl ethers, vinyl pyridine, 2-vinyl-5-methylpyridene, and the like. Such polymers with levels of carboxylic acid or anhydride from about 2 to about 15 weight percent, include poly(acrylonitrile-methyl acrylate-itaconic acid), ethylene-(meth)acrylic acid/fumaric acid-/itaconic acid/maleic anhydride copolymer, poly(-butadiene-acrylonitrile-methacrylic acid) terpolymer, isobutylene-maleic acid copolymer, vinyl chloride-vinyl acetate-unsaturated dibasic acid terpolymer, chloroprene-acrylic acid copolymer, acrylonitrile-alpha, beta-unsaturated carboxylic acid copolymer, poly(vinyl ether-maleic acid) copolymer, poly(vinyl acetateocrotonic acid) copolymer, isoprene-unsaturated carboxylic acid copolymer, poly(methyl vinyl ether-maleic acid) copolymer, poly((meth)acrylate-vinyl acetate-dicarboxylic acid) terpolymer, poly(ethylene-ethyl acrylate-maleic anhydride) terpolymer, poly(methacrylic acid-ethyl acrylate-methacrylamide), poly(isobutylene-methacrylic acid/anhydride) copolymer, poly(acrylic acid-2 methyl-5-vinyl pyridine) copolymer, poly(vinylidene chloride(meth)acrylic acid) copolymer, poly(ethylene-vinyl acetate-maleic anhydride) terpolymer, poly(vinyl chloride-vinyl acetate-maleic anhydride) terpolymer, and the like.

It is believed that the acid group present in the second copolymer participates in a chemical reaction with the poly(vinyl alcohol) to produce a segmented copolymer of the structure described above. A preferred embodiment of this segmented copolymer comprises a segmented copolymer wherein the trunk contains more than about 85 mol percent of units derived from vinyl alcohol, wherein the grafted or side-chain polymer contains from about 2 to about 25, preferably about 10 to about 20 parts by weight, of units derived from an unsaturated carboxylic acid or anhydride, the remainder being of units derived from methyl methacrylate, and wherein the trunk polymer is from about 70 to about 90 parts by weight of the graft copolymer.

The above description is based on an expected combination of the two polymers in weight ratios similar to those in the original ungrafted blend. However, it is quite possible that selected grafting will occur, so that the graft copolymer may contain more or less of the trunk component than in the original blend.

Even if grafting is not accomplished, the additives of the present invention improve the internal and external plasticization of the vinyl alcohol-containing polymers, probably by compatibilization through dipole-dipole and hydrogen-bonding interaction between appropriate functional groups. Such plasticization allows for the compounder to process the polymer above the melting point and below the decomposition temperature. Additional plasticizer may be added for improved processing, if desired.

The extent of grafting may be enhanced by the presence of catalysts for esterification reactions between acid or anhydride groups and alcohol groups, or by catalysts for reaction of epoxy groups with acid groups. Such catalysts may include acids, bases, organotin catalysts, organotitanium catalysts, and the like. The esterification reaction may be enhanced also by removal of water formed during the grafting reaction, such as by vacuum application to the reactor, such as a vacuum vent on the extruder. It is, of course, important that the reaction not be pushed to the point where the graft polymer becomes an intractable material which cannot be melt-processed.

The second copolymer may be prepared by any of the methods known to the art, such as in bulk, suspension, solution, and the like. Preferred for ease of polymerization, availability of higher molecular weights, and ease of isolating into powdery form, is emulsion polymerization. The weight-average molecular weight of the second polymer may vary from about 10,000 to about 500,000; preferred for ease of processing, thermal stability, and rheological properties is from about 10,000 to about 200,000. However, when the first polymer is of relatively high molecular weight, the preferred molecular weight range of the second polymer is from about 200 to about 100,000. Such low molecular weight polymers or oligomers may be made by several known methods, such as alkoxide-initiated polymerization of methyl methacrylate followed by partial hydrolysis, thermal dimerization of methyl methacrylic/methacrylic acid mixtures, and the like. By following the experimental procedures described below, the skilled practitioner can readily determine if appropriate melt strength has been achieved without raising the melt viscosity to the extent that processing and extrusion are difficult.

A compositional range of from about 80 to about 98 parts of the first polymer and correspondingly from about 2 parts to about 20 parts of the second polymer is contemplated. Below about 2 parts of the additive, the thermal stability is not greatly improved and the blends are yellow; above about 25 parts, the additive polymers do not disperse well and some diminution of properties, such as extensibility and impact strength, is seen. Preferred is about 10 to about 20 parts of the additive. The less of the additive required to achieve melt processability, the better will desirable PVOH properties, such as oxygen barrier, be maintained. Preferred for water-dispersible films as the first polymer is a copolymer of vinyl acetate hydrolyzed or saponified to a degree to retain from about 5 to about 13 mole % of vinyl acetate units. For certain properties such as barrier to gases, it is preferred that first polymer be essentially fully hydrolyzed.

The (meth)acrylate copolymers used in this invention were prepared by emulsion polymerization of commercially available acrylic or methacrylic esters, such as methyl methacrylate, with the unsaturated carboxylic acid. Levels of carboxylic acid, especially when the acid is acrylic acid, tend to give difficulties in emulsion polymerization, the resulting polymer being somewhat water-soluble. Other suitably adapted polymerization methods such as solution, suspension, or bulk polymerization may also serve to prepare the copolymers.

As noted, when the second polymer contains units derived from an unsaturated acid or anhydride, chemical attachment frequently occurs between the first and second polymers under processing conditions. These chemically joined polymers are defined as segmented polymers, where at least one segment of the first polymer as defined above is chemically joined to at least one segment of the second polymer. Since both types of segment have, prior to chemically joining, more than one reactive group, at this stage of investigation, it is difficult to describe the structure of the segmented polymer in conventional "graft copolymer" terminology. Depending on the relative amounts of first and second polymers and the extent of reaction, it is difficult to state which polymer is the trunk and which the graft.

Graft copolymers with poly(vinyl alcohol) trunks and (meth)acrylate-based grafts or side chains have been known for many years, and may be prepared by use of cerium (+IV) catalysts to form radical sites on the poly(vinyl alcohol) and then to initiate polymerization of the (meth)acrylate monomers from these sites. However, there has been no disclosure that prior art graft polymers are thermoplastic or melt-processable.

The additive polymer may be a ter- or tetrapolymer containing acid units from more than one acid or anhydride, and containing more than more than one (meth)acrylate ester units. Such ter- or tetrapolymers, especially those with a lower alkyl acrylate ester copolymerized, have somewhat lower softening temperatures, within the vicinity of the glass temperature of the amorphous phase of the polymer containing vinyl alcohol units, so that melt blending is easier to control, without a significant decrease in physical properties of the blend.

The first polymer may be a blend of more than one polymer containing vinyl alcohol units, such as those of differing molecular weight.

The first polymer, containing vinyl alcohol units, may be washed or be neutralized with acid such as phosphoric acid to remove residual sodium acetate, as taught in U.S. Pat. No. 3,425,979. The art teaches that sodium acetate from the alkaline hydrolysis of the copolymerized vinyl acetate accelerates the formation of conjugated species and chemical cross-links upon heating the polymer containing vinyl alcohol units to within a few degrees of its melting temperature. Washing to lower the level of sodium acetate to below about 0.1 weight percent, or treatment with an acid such as phosphoric acid, whose sodium salt is not deleterious to degradation of the polymer containing vinyl alcohol units, produces a polymer of enhanced thermal stability which allows more flexibility in the choice of blending conditions of the acrylic additive in the melt-processable blend. When the acid treatment is used, the acetic acid formed is removed in the extrusion process by appropriate venting. In both treatments, essentially all of the sodium acetate is removed, so that the content of sodium acetate is less than about 0.1 wt. percent, based on the polymer containing vinyl alcohol.

Blending of the two copolymers may be carried out most conveniently by dry mixing the finely granulated polymer particles prior to melt compounding in a single-or twin-screw extruder. In the process of dry blending, small quantities of additives may be added to the mixture of particulates for the purpose of improving the physical properties of the blend. Examples of additives may include one or more of the following classes of compounds: antioxidants, ultraviolet light absorbers, plasticizers, antistatic agent, slip agents, coloring agents, fillers and other compounds. Further, fugitive plasticizers, such as water in amounts about 3%, may be added to aid in compounding and processing the blend.

The blend may further be prepared by admixing the additive polymer in emulsion form, when an emulsion polymerization is a feasible way to prepare the additive polymer, with the poly(vinyl alcohol) in solid form, and then processing directly with water removal such as by extrusion in a vented extruder, or by drying the powder blend under vacuum, and then blending with the matrix polymer.

The blend may further contain glycerol in small amounts. Although glycerol may lower the glass temperature of the final blend, it can aid in obtaining better admixture of the two components, so as to avoid presence of gel or requirement of extensive melt-mixing.

The blend may further contain impact modifiers known to the art, such as multistage polymers based on a poly(acrylate) first stage or a polybutadiene first stage and a methacrylate or styrene second stage, which may be present as a shell or in separate domains within the core. Either stage may contain acid-functional groups.

The blends of the present invention may be considered as a polymer containing vinyl alcohol units modified with a processing aid, since the acrylic copolymer additive enables the poly(vinyl alcohol) to be melt-processed with a reduced tendency towards thermal decomposition, and aids in the formation of melt-processable objects or melt-processable intermediates, such as pellets.

The blends of the present invention, especially those which are melt-processable, are useful in many applications. When the vinyl alcohol polymer is water-soluble, a film from the blends can be broken down in water for ready disposal. Such blends in film form may also be useful as containers for toxic, corrosive, or skin-sensitizing chemicals which are to be used in water, such as agricultural chemicals to be sprayed. The blends in film form such as in blown film, are useful as high gas barrier films for packaging, especially of food. The films from the blends can be laminated onto substrates to form useful barrier structures for containment or packaging of food or beverages. The blends in container form, such as film, bottles, and the like may be used to exclude gases such as oxygen or to contain gases such as carbon dioxide. Blends with improved heat distortion properties may be useful in hot fill packaging or in retortable or sterilizable container packaging. The blends or laminates may also be useful in museum and other glazing where clarity and long-term retention of an inert atmosphere are desired. The blends may also be useful in bags for medical laundry, and for lamination of films to paper. The blends of the present invention may be used to form useful fibers. The blends may be processed from the melt or from a solventswollen gel. The melt-processable blends may be passed through an appropriate die to form filaments which may be stranded into single or multi-stranded fibers of various thicknesses. The fibers may then be further processed into appropriate products, such as packaging materials, water-soluble disposable cloths, such as diapers, and the like. The fibers may be post-treated after forming by chemicals which will insolubilize the poly(vinyl alcohol), and the resulting fibers may be processed into articles with high moisture uptake which do not dissolve in water. Further, the polymers may be spun by a solid state process wherein the fiber is oriented in the solid state to produce a fiber with a very high tensile modulus.

Films from the present blends may be laminated, co-extruded, or co-injection molded to form laminated structures with a good combination of clarity, toughness, and barrier properties. For example, a blend of a 9:1 methyl methacrylate/methacrylic acid copolymer in admixture with poly(vinyl alcohol) in a 50//50 mixture may be co-extruded with poly(ethylene terephthalate) (PET), with poly(methyl methacrylate), with poly(vinyl chloride), or with polycarbonate, to form continuous laminated film with good adhesion between the layers. The co-extruded film with PET can be thermoformed into useful objects without delamination. The blend may be varied through other compositional ratios, such as 60//40 or 80//20, and other combinations of copolymer, poly(vinyl alcohol) and other polymer may be co-extruded using technology known to the art. Multi-layer laminates may also be formed.

The blends described herein are also useful as hot-melt adhesives. A hot-melt adhesive is a thermoplastic polymer that is heated to obtain a liquid of flowable viscosity, and after application in adhesive form, is cooled to obtain a solid which in the solid form has sufficient adhesive and cohesive strength to maintain an acceptable adhesive bond against the test or use forces applied.

It is important with hot melt adhesives to join the two surfaces to be bonded together whilst the adhesive is still fluid. The term "open time" refers to the time interval between application of and setting or hardening of the molten adhesive. Hot melt additives are useful because they do not generate any water or solvent effluent, and thus are attractive for their lower cost, 100% efficiency, and their ecological benefits.

Hot melt additives may be dispersed from small hand-made "guns" or valved dispensing nozzles to large machines pumping adhesive through slot jaws. They may also be dispersed in the foamed form. For application of complex adhesive patterns, an embossed roll is used. In some cases, the hot adhesive may be applied to one surface to be bonded, cooled, then re-heated at the time of bonding to the second surface. In some cases, the adhesive may be in powder form; as such, it is distributed upon one surface, heated in place, and the second surface to be bonded then applied.

PVOH resins of diverse degree of hydrolysis and molecular weight are currently employed as adhesives in the fabrication of a large number of products such as: bag making, carton sealing, Kraft paper band making, corrugating, paper tubing, book binding, paper board laminating, remoistenable adhesive (aqueous base), tapes, trading stamps, postage stamps, labels, decals, envelopes etc. The adhesive is prepared from a PVOH-water solution or suspension at a low (7-20% w/w) solid content. The substrate is coated with wax before application of the aqueous solution. The adhesive coated substrate is dried at a temperature gradient, which ranges from 80° to 170 ° C., in a drying oven for 10 to 15 minutes. The above method of application of the adhesive is a direct consequence of the inherent thermal instability of PVOH. Because of the high cohesive energy density and polarity due to the hydroxy groups, attempts to melt PVOH result in severe degradation. The strong inter- and intramolecular interactions resulting from the high polarity of the —OH functional group give rise to a melting temperature in the vicinity of the degradation temperature of PVOH. Consequently, melting is accompanied by degradation.

In order to render PVOH melt processable, steps have been taken to break up the hydrogen bonding network and crystallinity by the addition of external plasticizers. This technique is well known in the art and clearly elucidated in U.S. Pat. No. 3,143,518, which describes the preparation and use of PVOH-propylene glycol compositions as hot melt adhesive. U.S. Pat. No. 3,121,701 also provides examples of the use of highly plasticized partially hydrolyzed PVOH as hot melt adhesive. Amongst the best known plasticizers of PVOH are the solid and liquid polyols; these include polyethylene glycol, neopentyl glycol, 2,2,4-trimethyl-1,3-pentanediol and glycerol respectively.

The use of small molecules or oligomers as plasticizers for hot melt adhesives based on PVOH has its inherent limitations and disadvantages. The current state of the art in PVOH hot melt adhesive technology employs 10-40 parts of plasticizer to 100 parts of PVOH. This high level of plasticization leads to phase separation and embrittlement of the plasticized matrix. Low levels of plasticizer concentration, on the other hand, lead to the formation of highly viscous inextrudable melts during reprocessing. Upon re-melting plasticized PVOH, the low molecular weight plasticizer migrates and evaporates from the molten resin. In the absence of the plasticizer, the PVOH rapidly recrystallizes and embrittles the adhesive. In the hot melt adhesive application, this embrittlement compromises the integrity of the bond between adhesive and substrate. Another shortcoming of externally plasticized PVOH, which manifests itself when the plasticized PVOH resin comes into contact with alkaline or acidic solvents, is the hydrolysis and subsequent embrittlement of the partially hydrolyzed PVOH resin that is frequently used in the preparation of plasticized PVOH material.

One of the unexpected advantages of the use of the present acrylic additives to plasticized PVOH is that the acrylic additive suppresses plasticizer migration. While it is desirable to use as little as possible to achieve the desired end-use performance, for hot-melt adhesives, for example, it is possible (and indeed, preferred for the purposes of lowering the viscosity of the melt at application temperatures) to use up to 20 parts of plasticizer to decrease melt viscosity without undesirable plasticizer migration.

The examples described in TABLES XXII and XXIII are illustrative of the efficacy of the acrylic-modified PVOH as a hot melt adhesive. The composition of each example is given in weight percent. The particular PVOH polymers used in the examples were obtained from AIR PRODUCTS (AIRVOL) and DuPont (ELVANOL). The polymers are as follows: AIRVOL-107 is a fully hydrolyzed (98.0-98.8 mol %) resin having a solution viscosity of 5.4-6.5 cPs determined on a 4% aqueous solution at 20° C. The molecular weight of this polymer is Mw=31-50,000. AIRVOL-321 is also a fully hydrolyzed PVOH resin of solution viscosity ranging from 16.5 to 20.5 and Mw ranging from about 93 to 150,000. AIRVOL-205 is a partially hydrolyzed (87-89 mol %) resin of similar solution viscosity and molecular weight to that of AIRVOL-107. ELVANOL-5105 is a low solution viscosity (5-6 cPs), gel resistant, partially hydrolyzed (87-89 mol %) PVOH resin. The acrylic ter- and tetrapolymers were prepared from commercially available monomers (MMA, EA, NVP and MAA) by emulsion polymerization and isolated by spray drying or coagulation.

The adhesive compositions may also include any or all of the following: preservatives, antioxidants, glyceryl ester of hydrogenated wood rosin, corn or potato starch, ethylene glycol, trimethylene glycol, tetramethylene glycol, pentamethylene glycol, hexamethylene glycol, propylene glycol, glycerin, 2,3-butanediol, 1,3-butanediol, diethylene glycol, triethylene glycol, polyethylene glycol, ethyleneurea, urea, sorbitol and mannitol. A tackifying resin such as rosin or terpene phenol may also be added to the blend compositions. The use of low levels of glycerol is exemplified in the final examples.

In the hot-melt adhesive formulations, it may be desirable to have present in the second polymer, for purposes of improving adhesion of the hot melt to the cellulosic substrate, units of the structure

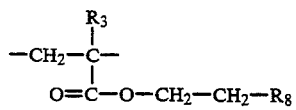

or

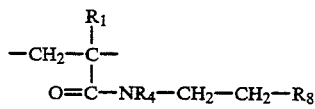

wherein R₄ is H or C₁-C₄ alkyl, and wherein R₈ is a urea or cyclic ureido structure of the formula

or

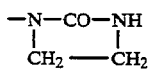

EXAMPLES

This example teaches the general method for preparing copolymers of methyl methacrylate and methacrylic acid. A copolymer comprising 15 weight percent methacrylic acid (MAA), and the remainder methyl methacrylate (MMA) was prepared by an emulsion polymerization technique as follows: A monomer mixture was prepared, which contained 1122 grams of MMA, 198 grams of MAA, 10.56 grams of n-dodecyl mercaptan, 782.71 grams of deionized water and 24.75 grams of a 10% aqueous sodium dodecylbenzene sulfonate solution. To an appropriate glass vessel equipped with stirrer, heater, a reflux condenser, and nitrogen sparge tube, was added 1753.26 grams of deionized water, and 0.59 grams of sodium carbonate. The mixture was sparged for one hour with nitrogen while heating to 70° C. The sparge rate was then changed to a sweep and 74.25 grams of a 10% aqueous solution of sodium dodecylbenzene sulfonate was added to the mixture. The temperature of the reaction vessel was then raised to 85° C. At this temperature, 29.343 grams of the initiator mixture, which consisted of 1.32 grams of sodium persulfate and 380.08 grams of deionized water, was added to the reaction vessel, along with 31.42 mL of rinse water. The monomer mixture was then fed into the reaction vessel over a three-hour period.

As the polymerization proceeded, the initiator mixture was added to the reaction vessel at the rate of 29.34 mL every 15 minutes. The accumulation of solids was measured every 30 minutes just before the addition of the initiator mixture. At the completion of the initiator and monomer addition, followed by a 31.42 mL water rinse of each feed line, the mixture was held at 85° C. for one hour. The mixture was then cooled, filtered and the polymer isolated by freeze-drying. The polymer was dried in a vacuum oven prior to blending experiments. The molecular weight of this polymer was about 80,000.

In a similar manner, other polymers of controlled molecular weight of alkyl (meth)acrylates and unsaturated acids may be prepared.

The ASTM test methods employed are as follows: Specific Gravity-D792-66 (re-approved 1979); Tensile-Yield, Elongation and Tensile Elastic Modulus-D638-84; Tensile Impact Strength ASTM D1822; Izod Impact-D256-84; Charpy Impact ASTM D256; Heat Deflection Temperature D648-72; Clash-Berg Torsional Modulus-D-1043; Oxygen Permeability ASTM D-3985.

The following solvent fractionation scheme was prepared to calculate the percent of graft links and grafting efficiency of the (MMA-MAA) acrylic copolymers:

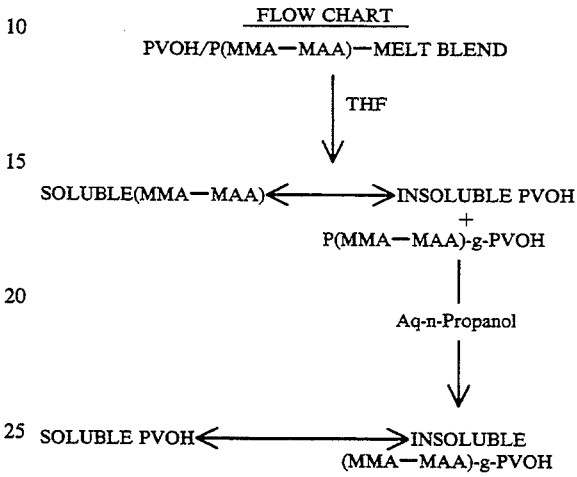

The percent grafted PVOH and grafting efficiency of the acrylic copolymer (MMA-MAA), calculated from the above scheme and listed in TABLE IV, are supported qualitatively by FTIR spectra. The FFIR spectra show increasing evidence of the presence of an ester carbonyl stretching frequency within the frequency range of 1726–1735 cm-1. It is noteworthy to mention that evidence of this ester is not discernible in either the FTIR spectrum of the acrylic terpolymer nor that of the poly(vinyl alcohol). Hence, we may conclude that this ester functionality may have resulted from the esterification reaction between the —OH of PVOH and the —COOH of the acrylic polymer containing acid groups.

Another evidence of grafting is discernible from the increase in tensile-modulus with increasing percent graft.

Example 1–58

These examples disclose-typical blend conditions for blends reported in Table I.

PVOH and a copolymer of methyl methacrylate-methacrylic acid were dry blended in a polyethylene bag to form a mixture in a 80:20% weight ratio of PVOH to methyl methacrylate-co-MAA copolymer. For Airvol ® 205-based blends (Table I), the mixture was fed into the hopper of a single screw Killion extruder in which the mixture was melt compounded and extruded at the following extrusion conditions: extruder zone-1, 180° C.; zone 2, 193° C.; zone 3, 193° C.; die-1 and die-2, 193° C.; screw speed 80 rpm. The pelletized samples were dried in a forced air oven and then molded in an Arburg injection molding machine equipped with a heated ASTM family mold for the formation of test pieces. The molding conditions were: nozzle: 199° C.; zones 1, 2, and 3: 200° C.; injection pressure 6.2 MPa; back pressure 1.4 MPa; mold temperature 24° C.

For Airvol ® 107-based blends (Table I), the mixture was fed into the hopper of a single screw Killion extruder in which the mixture was melt compounded and extruded at the following extrusion conditions: extruder zone-1, 199° C.; zone 2, 216° C.; zone 3, 216° C.; die-1 and die-2, 210° C.; screw speed 80 rpm. The pelletized samples were dried in a forced air oven and then molded in an Arburg injection molding machine equipped with a heated ASTM family mold for the formation of test pieces. The molding conditions were: nozzle: 226° C.; zones 1, 2, and 3: 235°–240° C.; injection pressure 6.6 MPa; back pressure 1.4 MPa; mold temperature 35° C.

Other conditions may be used, depending on the viscosity of the blend. Tg, and % crystallinity (% Crys.) are measured by differential scanning calorimetry.

Tables II and III summarize the physical properties of the blends. Table IV describes the extent of grafting in one blend thoroughly analyzed.

The following table identifies starting materials and blends for which data are presented in the subsequent tables.

TABLE I

Thermal Properties of Homopolymers and Blends in the Systems: P(MMA-MAA)/Airvol ®-107 (PVOH homopolymer) and P(MMA-MAA)/Airvol ®-205 (87–89% hydrolyzed PVOH/VAc, Mw 31–50,000

| No. | Polymer Blend | Comp. % w/w | Mw | Tg (°C.) | Tm (°C.) | Crys. (%) |
|---|---|---|---|---|---|---|
| 1. | Airvol ®-107 | 100 | 31–50k | 75.29 | 221.58 | 47.57 |
| 2. | P(MMA-MAA = 99/01) | 100 | 168k | 124.24 | | |
| 3. | P(MMA-MAA = 97/03) | 100 | 182k | 127.69 | | |
| 4. | P(MMA-MAA = 95/05) | 100 | 152k | 129.10 | | |
| 5. | P(MMA-MAA = 93/07) | 100 | 172k | 136.71 | | |
| 6. | P(MMA-MAA = 90/10) | 100 | 179k | 142.29 | | |
| 7. | P(MMA-MAA = 85/15) | 100 | 179k | 151.24 | | |
| 8. | P(MMA-MAA = 80/20) | 100 | 199k | 159.60 | | |
| 9. | Airvol ®-107/P(MMA-MAA = 99/01) | 80/20 | (Ex.2) | 74.28 | 217.67 | 39.46 |
| 10. | Airvol ®-107/P(MMA-MAA = 97/03) | 80/20 | (Ex.3) | 73.46 | 218.33 | 40.04 |
| 11. | Airvol ®-107/P(MMA-MAA = 95/05) | 80/20 | (Ex.4) | 73.71 | 218.88 | 36.27 |
| 12. | Airvol ®-107/P(MMA-MAA = 93/07) | 80/20 | (Ex.5) | 75.08 | 219.78 | 39.45 |
| 13. | Airvol ®-107/P(MMA-MAA = 80/20) | 80/20 | (Ex.6) | 75.30 | 219.94 | 39.72 |
| 14. | Airvol ®-107/P(MMA-MAA = 85/15) | 80/20 | (Ex.7) | 75.30 | 221.20 | 43.89 |
| 15. | Airvol ®-107/P(MMA-MAA = 80/20) | 80/20 | (Ex.8) | 74.59 | 220.60 | 40.73 |
| 16. | Airvol ®-205 | | 31–50k | 68.26 | 173.42 | 13.75 |
| 17. | Airvol ®-205/P(MMA-MAA = 99/01) | 80/20 | (Ex.2) | 69.69 | 185.21 | 21.43 |
| 18. | Airvol ®-205/P(MMA-MAA = 97/03) | 80/20 | (Ex.3) | 69.22 | 188.06 | 22.67 |
| 19. | Airvol ®-205/P(MMA-MAA = 95/05) | 80/20 | (Ex.4) | 69.64 | 190.85 | 22.78 |
| 20. | Airvol ®-205/P(MMA-MAA = 93/07) | 80/20 | (Ex.5) | 69.18 | 193.06 | 26.17 |
| 21. | Airvol ®-205/P(MMA-MAA = 90/10) | 80/20 | (Ex.6) | 70.24 | 191.37 | 24.81 |
| 22. | Airvol ®-205/P(MMA-MAA = 85/15) | 80/20 | (Ex.7) | 69.93 | 192.58 | 24.23 |
| 23. | P(MMA-MAA = 95/05) | 100 | 126k | 129.90 | | |
| 24. | P(MMA-MAA = 95/05) | 100 | 78.6k | 125.90 | | |
| 25. | P(MMA-MAA = 95/05) | 100 | 66.4k | 126.10 | | |
| 26. | P(MMA-MAA = 95/05) | 100 | 37.1k | 120.00 | | |
| 27. | P(MMA-MAA = 90/10) | 100 | 122.0k | 138.10 | | |
| 28. | P(MMA-MAA = 90/10) | 100 | 78.9k | 136.50 | | |
| 29. | P(MMA-MAA = 90/10) | 100 | 63.1k | 134.20 | | |
| 30. | P(MMA-MAA = 90/10) | 100 | 42.3k | 130.70 | | |
| 31. | P(MMA-MAA = 85/15) | 100 | 80.1k | 149.30 | | |
| 32. | P(MMA-MAA = 85/15) | 100 | 76.0k | 148.00 | | |
| 33. | P(MMA-MAA = 85/15) | 100 | 60.6k | 143.60 | | |
| 34. | P(MMA-MAA = 85/15) | 100 | 39.3k | 139.10 | | |
| 35. | Airvol ®-205/P(MMA-MAA = 95/05) | 80/20 | (Ex.23) | 69.92 | 180.18 | 19.62 |
| 36. | Airvol ®-205/P(MMA-MAA = 95/05) | 80/20 | (Ex.24) | 70.99 | 177.31 | 20.18 |
| 37. | Airvol ®-205/P(MMA-MAA = 95/05) | 80/20 | (Ex.25) | 71.02 | 183.81 | 19.72 |
| 38. | Airvol ®-205/P(MMA-MAA = 95/05) | 80/20 | (Ex.26) | 72.03 | 183.37 | 18.57 |
| 39. | Airvol ®-205/P(MMA-MAA = 90/10) | 80/20 | (Ex.27) | 69.79 | 189.86 | 22.84 |
| 40. | Airvol ®-205/P(MMA-MAA = 90/10) | 80/20 | (Ex.28) | 70.70 | 188.93 | 24.61 |
| 41. | Airvol ®-205/P(MMA-MAA = 90/10) | 80/20 | (Ex.29) | 70.81 | 189.24 | 22.45 |
| 42. | Airvol ®-205/P(MMA-MAA = 90/10) | 80/20 | (Ex.30) | 71.52 | 187.70 | 22.38 |
| 43. | Airvol ®-205/P(MMA-MAA = 85/15) | 80/20 | (Ex.31) | 70.72 | 192.00 | 23.80 |
| 44. | Airvol ®-205/P(MMA-MAA = 85/15) | 80/20 | (Ex.32) | 70.63 | 190.88 | 23.79 |
| 45. | Airvol ®-205/P(MMA-MAA = 85/15) | 80/20 | (Ex.33) | 71.25 | 191.66 | 24.14 |
| 46. | Airvol ®-205/P(MMA-MAA = 85/15) | 80/20 | (Ex.34) | 71.88 | 192.04 | 24.13 |
| 47. | Airvol ®-107/P(MMA-MAA = 95/05) | 80/20 | (Ex.23) | 75.96 | 225.02 | 48.16 |
| 48. | Airvol ®-107/P(MMA-MAA = 95/05) | 80/20 | (Ex.24) | 75.28 | 222.77 | 48.50 |
| 49. | Airvol ®-107/P(MMA-MAA = 95/05) | 80/20 | (Ex.25) | 75.96 | 222.50 | 47.55 |
| 50. | Airvol ®-107/P(MMA-MAA = 95/05) | 80/20 | (Ex.26) | 75.71 | 222.94 | 46.34 |
| 51. | Airvol ®-107/P(MMA-MAA = 90/10) | 80/20 | (Ex.27) | 78.24 | 223.99 | 49.94 |
| 52. | Airvol ®-107/P(MMA-MAA = 90/10) | 80/20 | (Ex.28) | 77.10 | 223.65 | 47.22 |
| 53. | Airvol ®-107/P(MMA-MAA = 90/10) | 80/20 | (Ex.29) | 76.08 | 222.98 | 47.12 |
| 54. | Airvol ®-107/P(MMA-MAA = 90/10) | 80/20 | (Ex.30) | 80.85 | 223.47 | 44.67 |
| 55. | Airvol ®-107/P(MMA-MAA = 85/15) | 80/20 | (Ex.31) | 77.92 | 224.30 | 48.38 |
| 56. | Airvol ®-107/P(MMA-MAA = 85/15) | 80/20 | (Ex.32) | 76.91 | 224.52 | 45.93 |
| 57. | Airvol ®-107/P(MMA-MAA = 85/15) | 80/20 | (Ex.33) | 77.98 | 223.85 | 46.85 |
| 58. | Airvol ®-107/P(MMA-MAA = 85/15) | 80/20 | (Ex.34) | 76.61 | 224.26 | 46.37 |

The data in Table I indicates that for the PVOH homopolymer, the addition of the additive polymers only slightly lowers the crystalline melting point, and only slightly decreases the glass temperature, while a lowered, but still high degree of crystallinity is maintained. For the PVOH/PVAc copolymer, the addition of the additive polymers raises the crystalline melting point and the glass temperature, while the degree of crystallinity is enhanced.

In the following table are summarized the properties of the blends with the partially hydrolyzed PVOH (Airvol®-205) with several of the additive copolymers of poly(methyl methacrylate-methacrylic acid). In general, tensile modulus is improved with increasing the amount of acid supplied by the copolymer in the blend, while tensile impact strength is decreased.

TABLE II

Physical Properties of Alloys with PVOH Homopolymer: Variations in MAA Content of Modifier

| Physical Properties | Examples | | | | |
|---|---|---|---|---|---|
| | 10 | 12 | 13 | 14 | 15 |
| Specific Gravity | | 1.28 | 1.28 | 1.28 | 1.29 |
| Tensile-Yield, mPa | | 127 | 129 | — | 131 |
| Elongation @ Break % | 4.16 | 12.66 | 10.78 | 3.52 | 4.44 |
| Tensile-Modulus, mPa | 3458 | 5925 | 5967 | 5884 | 5870 |
| Tensile Impact Strength (Joules/M$^2$) | 36575 | 96692 | 82819 | 63691 | 57595 |
| Dynatup Impact Strength (Joules) | 1.50 | 1.93 | 1.71 | 1.60 | 1.31 |
| Notched Izod @ 0° C. (Joules/M) | | 20.82 | 22.42 | 23.49 | 24.55 |
| Notched Izod @ 23° C. (Joules/M) | 21.35 | 23.49 | 22.95 | 21.35 | 21.35 |
| Unnotched Izod @ 23° C. (Joules/M) | 530 | 414 | 496 | 385 | 367 |
| Unnotched Charpy (Joules/0.5 M$^2$) @ 23° C. | 112919 | 96019 | 95515 | 88494 | 79918 |
| DTUFL (264 kPa, 2° C./min.) (unannealed) °C. | 582 | 574 | 570 | 630 | 671 |
| DTUFL (264 kPa, 2° C./min.) (ann. 4 hrs. @ 80° C.), °C. | 633 | 640 | 660 | 656 | 647 |
| Clash-Berg Torsional Modulus, | | | | | |
| mPa @ 40° C. | | 5094 | 5094 | 5377 | 4993 |
| mPa @ 80° C. | | 1169 | 955 | 936 | 1311 |
| mPa @ 120° C. | | 330 | 297 | 312 | 397 |

| Physical Properties | Examples | | | |
|---|---|---|---|---|
| | 47 | 50 | 54 | 58 |
| Elongation @ Break % | 116.95 | 2.94 | 3.62 | 3.62 |
| Tensile-Modulus, mPa | 5874 | 6009 | 6173 | 6102 |
| Tensile Impact Strength (Joules/M$^2$) | 70837 | 46034 | 54442 | 42460 |
| Dynatup Impact Strength (Joules) | 1.76 | 2.08 | 1.88 | 2.01 |
| Notched Izod @ 0° C. (Joules/M) | 20.82 | 13.88 | 16.55 | 15.48 |
| Notched Izod @ 23° C. (Joules/M) | 22.95 | 14.41 | 15.48 | 14.41 |
| Unnotched Charpy (Joules/0.5 M$^2$) @ 23° C. | 77816 | 53559 | 4666 | 41872 |
| DTUFL (264 kPa, 2° C./min.) (unannealed) °C. | 600 | 594 | 593 | 634 |
| Clash-Berg Torsional Modulus, | | | | |
| mPa @ 40° C. | 5426 | 5610 | 5240 | |
| mPa @ 80° C. | 1221 | 1122 | 1135 | |
| mPa @ 120° C. | 326 | 421 | 401 | |

TABLE III

Physical Properties of Alloys with Partially-Hydrolyzed PVOH: Variations in MAA Content and Molecular Weight of Modifier

| Physical Properties | Examples | | | | | |
|---|---|---|---|---|---|---|
| | 17 | 18 | 19 | 20 | 21 | 22 |
| Specific Gravity | 1.26 | 1.26 | 1.26 | 1.26 | 1.26 | 1.26 |
| Tensile Yield, mPa | 85.64 | 82.82 | 82.68 | 82.89 | 82.20 | 81.99 |
| Elongation @ Break % | 60.40 | 28.80 | 75.20 | 62.10 | 61.90 | 59.50 |
| Tensile-Modulus, mPa | 4719 | 4445 | 4620 | 4755 | 4781 | 4837 |
| Tensile Impact Strength (Joules/M$^2$) | 90596 | 87674 | 84711 | 77774 | 58856 | 60327 |
| Dynatup Impact Strength (Joules) | 4.12 | 3.41 | 3.16 | 2.60 | 2.79 | 2.31 |
| Notched Izod @ 0° C. (Joules/M) | 17.62 | 17.08 | 19.75 | 21.89 | 22.95 | 22.42 |
| Notched Izod @ 23° C. (Joules/M) | 22.95 | 24.02 | 21.89 | 21.89 | 21.35 | 16.01 |
| Unnotched Izod @ 23° C. | 378 | 360 | 492 | 358 | 354 | 349 |

TABLE III-continued

Physical Properties of Alloys with Partially-Hydrolyzed PVOH: Variations in MAA Content and Molecular Weight of Modifier

| (Joules/M) | | | | | | |
|---|---|---|---|---|---|---|
| Unnotched Charpy (Joules/0.5 M²) @ 23° C. | 80759 | 73192 | 80338 | 79582 | 67979 | 70249 |
| DTUFL (264 kPa, 2° C./min.) (unannealed) °C. | 433 | 459 | 443 | 463 | 444 | 446 |
| DTUFL (264 kPa, 2° C./min.) (ann. 4 hrs. @ 80° C.), °C. | 469 | 452 | 464 | 450 | 461 | 449 |
| Clash-Berg Torsional Modulus, | | | | | | |
| mPa @ 40° C. | 3617 | 3185 | 3204 | 3270 | 3996 | 3872 |
| mPa @ 80° C. | 217 | 171 | 181 | 200 | 200 | 235 |
| mPa @ 120° C. | 55 | 58 | 61 | 67 | 69 | 77 |

| | Examples | | | |
|---|---|---|---|---|
| Physical Properties | 35 | 36 | 37 | 38 |
| Specific Gravity | 1.26 | 1.26 | 1.26 | 1.26 |
| Tensile-Yield, mPa | 95.22 | 95.22 | 97.15 | 99.84 |
| Elongation @ Break % | 68.70 | 94.50 | 63.10 | 44.70 |
| Tensile-Modulus, mPa | 5540 | 5312 | 5602 | 5815 |
| Tensile Impact Strength (Joules/M²) | 124228 | 83239 | 74831 | 46664 |
| Dynatup Impact Strength (Joules) | 2.26 | 1.80 | 2.20 | 1.01 |
| Notched Izod @ 0° C. (Joules/M) | 23.49 | 20.28 | 12.81 | 13.35 |
| Notched Izod @ 23° C. (Joules/M) | 19.75 | 11.21 | 11.74 | 14.41 |
| Unnotched Izod @ 23° C. (Joules/M) | 637 | 558 | 399 | 135 |
| Unnotched Charpy (Joules/0.5 M²) @ 23° C. | 87191 | 99214 | 46307 | 70837 |
| DTUFL (264 kPa, 2° C./min.) (unannealed) °C. | 461 | 452 | 464 | 452 |
| DTUFL (264 kPa, 2° C./min.) (ann. 4 hrs. @ 80° C.), °C. | 473 | 463 | 486 | 470 |
| Clash-Berg Torsional Modulus, | | | | |
| mPa @ 40° C. | 3764 | 3597 | 3850 | 3587 |
| mPa @ 80° C. | 194 | 195 | 205 | 166 |
| mPa @ 120° C. | 56 | 37 | 35 | 29 |

| | Examples | | | |
|---|---|---|---|---|
| Physical Properties | 39 | 40 | 41 | 42 |
| Specific Gravity | 1.26 | 1.26 | 1.26 | 1.26 |
| Tensile-Yield, mPa | 94.39 | 94.46 | 95.36 | 99.15 |
| Elongation @ Break % | 68.7 | 79.4 | 58.5 | 33.9 |
| Tensile-Modulus, mPa | 5388 | 5409 | 5519 | 5753 |
| Tensile Impact Strength (Joules/M²) | 68105 | 151344 | 152185 | 31740 |
| Dynatup Impact Strength (Joules) | 3.70 | 2.82 | 1.75 | 1.12 |
| Notched Izod @ 0° C. (Joules/M) | 18.15 | 14.41 | 14.41 | 13.35 |
| Notched Izod @ 23° C. (Joules/M) | 16.55 | 13.35 | 10.68 | 13.88 |
| Unnotched Izod @ 23° C. (Joules/M) | 420 | 469 | 515 | 106 |
| Unnotched Charpy (Joules/0.5 M²) @ 23° C. | 95683 | 95977 | 96440 | 49313 |
| DTUFL (264 kPa, 2° C./min) (unannealed) °C. | 460 | 455 | 464 | 459 |
| DTUFL (264 kPa, 2° C./min.) (ann. 4 hrs. @ 80° C.), °C. | 467 | 471 | 484 | 484 |
| Clash-Berg Torsional Modulus, | | | | |
| mPa @ 40° C. | 3872 | 3645 | 3574 | 3496 |
| mPa @ 80° C. | 242 | 208 | 223 | 235 |
| mPa @ 120° C. | 68 | 60 | 66 | 69 |

| | Examples | | | |
|---|---|---|---|---|
| Physical Properties | 43 | 44 | 45 | 46 |
| Specific Gravity | 1.26 | 1.27 | 1.26 | 1.26 |
| Tensile-Yield, mPa | 95.56 | 95.56 | 94.94 | 96.12 |
| Elongation @ Break % | 72.30 | 92.40 | 69.90 | 60.20 |
| Tensile-Modulus, mPa | 5340 | 5409 | 5422 | 5519 |
| Tensile Impact Strength (Joules/M²) | 73780 | 86813 | 130955 | 86392 |
| Dynatup Impact Strength (Joules) | 1.86 | 1.47 | 1.59 | 1.20 |
| Notched Izod @ 0° C. (Joules/M) | 20.82 | 20.82 | 13.35 | 17.62 |

TABLE III-continued

Physical Properties of Alloys with Partially-Hydrolyzed PVOH: Variations in MAA Content and Molecular Weight of Modifier

| | | | | |
|---|---|---|---|---|
| Notched Izod @ 23° C. (Joules/M) | 17.08 | 19.75 | 12.28 | 16.01 |
| Unnotched Izod @ 23° C. (Joules/M) | 429 | 501 | 562 | 357 |
| Unnotched Charpy (Joules/0.5 $M^2$) @ 23° C. | 90554 | 88242 | 84542 | 72309 |
| DTUFL (264 kPa, 2° C./min.) (unannealed) °C. | 451 | 446 | 464 | 447 |
| DTUFL (264 kPa, 2° C./min.) (ann. 4 hrs. @ 80° C.), °C. | 476 | 461 | 476 | 467 |
| Clash-Berg Torsional Modulus, | | | | |
| mPa @ 40° C. | 3872 | 3645 | 3573 | 3496 |
| mPa @ 80° C. | 242 | 208 | 223 | 235 |
| mPa @ 120° C. | 68 | 60 | 66 | 69 |

TABLE IV

GRAFTING OF P(MMA-MAA) ONTO Airvol ®-107

| Example | Initial Wt. of PVOH (g) | Wt. of PVOH After Grafting (g) | Percent Graft (%) | Graft Efficiency (%) |
|---|---|---|---|---|
| 13 | 2.4093 | 2.6927 | 11.76 | 61.30 |
| 14 | 2.4048 | 2.7312 | 13.57 | 49.00 |

Example 59

In the specific examples which follow presenting blend data, the following poly(vinyl alcohol) polymers and processing conditions are used.

The particular PVOH materials used in the Examples were obtained from Air Products. They are as follows: Airvol-107, is a fully hydrolyzed (98.0–98.8 mol %) resin having a solution viscosity of 5.4–6.5 cPs determined on a 4% aqueous solution at 20° C. The Mw of this PVOH is 31,000–50,000. Another PVOH resin employed is Air Products Airvol-205 which is a partially hydrolyzed (87–89 mol %) resin possessing a solution viscosity of 5–6 cPs when determined on a 4% aqueous solution at 20° C. Airvol-205 has Mw of 31,000–50,000. Two other PVOH polymers referred to are Airvol-103 and Airvol-325. Airvol-103 is a fully hydrolyzed (98.0–98.8 MOL %) resin having a solution viscosity of 3.2–4.2 cPs(Mw=13–23k) determined on a 4% aqueous solution at 20° C. Airvol-325 is also a fully hydrolyzed PVOH resin, Mw=85–146k.

The PVOH (Airvol-205) specified above and the acrylic or styrenic copolymers were dry blended in a polyethylene bag to yield well homogenized mixtures. The mixtures were fed into the hopper of a single screw Killion extruder in which the mixtures were melt compounded and extruded at the following extrusion conditions:

| EXTRUDER BARREL TEMPERATURES: | ZONE-1: 180° C. |
| --- | --- |
| | ZONE-2: 193° C. |
| | ZONE-3: 193° C. |
| DIE TEMPERATURES: | DIE-1: 193° C. |
| | DIE-2: 193° C. |
| SCREW SPEED: | 80 RPM |

The mechanical properties of the alloy were evaluated with the aid of parts which were prepared by injection molding by the following procedure:

The pelletized extrudates were dried in a forced air oven prior to injection molding in an Arburg injection molding machine equipped with a heated ASTM family mold. The molding conditions were as follows:

| INJECTION MOLDER TEMPERATURES: | NOZZLE: 199° C. |
| --- | --- |
| | ZONE-1: 200° C. |
| | ZONE-2: 200° C. |
| | ZONE-3: 200° C. |
| INJECTION PRESSURE: | 6.2 MPa |
| BACK PRESSURE: | 1.4 MPa |
| MOLD TEMPERATURE: | 24° C. |

The PVOH (Airvol-107) specified above and the acrylic or styrenic copolymers were dry blended to yield homogeneous mixtures. The mixtures were fed into the hopper of a single screw Killion Extruder where the dry powder was melt compounded, extruded and pelletized at temperatures ranging from 199°–216° C. and screw speed of 80 RPM.

| EXTRUDER BARREL TEMPERATURES: | ZONE-1: 199° C. |
| --- | --- |
| | ZONE-2: 216° C. |
| | ZONE-3: 216° C. |
| DIE TEMPERATURES: | DIE-1: 210° C. |
| | DIE-2: 210° C. |
| SCREW SPEED: | 80 RPM |

The mechanical properties of the alloy were evaluated with the aid of parts which were prepared by injection molding by the following procedure:

The pelletized extrudates were dried in a forced air oven prior to injection molding in an Arburg injection molding machine equipped with a heated ASTM family mold. The molding conditions were as follows:

| INJECTION MOLDER TEMPERATURES: | NOZZLE: 226° C. |
| --- | --- |
| | ZONE-1: 235° C. |
| | ZONE-2: 240° C. |
| | ZONE-3: 240° C. |
| INJECTION PRESSURE: | 6.6 MPa |
| BACK PRESSURE: | 1.4 MPa |
| MOLD TEMPERATURE: | 35° C. |

When processed by themselves, the Airvol-107, -205, and -325 produced a yellow, unstable melt, and were unsuitable for melt-processing. Airvol 103 was not tested by itself in this series.

Examples 60–70

The following examples illustrate thermal and physical properties of blends with specific poly(vinyl alcohol) polymers of a polymer of methyl methacrylate containing glutaric anhydride (MMA-GAH) units or with a styrene/maleic anhydride (St-MAH) copolymer. The latter polymer is sold commercially as Dylark (R) 232, and is believed to contain ca. 8 mol % of units derived from maleic anhydride. The former polymer is prepared by the method of Hallden-Abberton et al., U.S. Pat. No. 4,874,824 from a poly(methyl methacrylate) homopolymer of MW ca. 150,000.

TABLE V

Thermal Properties of Acrylic and Styrenic Copolymers containing Anhydride Groups and Blends of the same with Airvol-107 and Airvol-205 Vinyl Alcohol Polymers

| EX. | POLYMER/BLEND | COMP. % w/w | Mw | Tg(°C.) | Tm(°C.) | CRYS.(%) |
|---|---|---|---|---|---|---|
| 60. | P(ST-MAH = 92/08) | 100 | 270k | 122.8 | | |
| 61. | P(MMA-GAH = 91.4/8.6) | 100 | 150k | 121.3 | | |
| 62. | Airvol-107/P(ST-MAH = 92/8) | 80/20 | | 116.7;76.4 | 225.2 | 39.7 |
| 63. | Airvol-205/P(ST-MAH = 92/8) | 80/20 | | 110.8;68.4 | 186.4 | 16.2 |
| 64. | Airvol-107/P(MMA-GAH = 91.4/8.6) | 80/20 | | 74.5 | 223.5 | 36.3 |

TABLE VI

Physical Properties of Alloys Consisting of Airvol-205 and the Acrylic and Styrenic Copolymers: P(MMA-GAH) and P(Styrene-co-Maleic Anhydride).

| POLYMERS | Examples 65 | 64 | 66 | 67 |
|---|---|---|---|---|
| Airvol-205 | 90 | 80 | 70 | 90 |
| P(MMA-GAH = 91.4/8.6) | 10 | 20 | 30 | |
| P(ST-MAH = 92/8) | | | | 10 |
| PHYSICAL PROPERTIES | | | | |
| TENSILE-YIELD, MPa | 96.9 | 93.0 | 89.4 | 95.2 |
| ELONGATION @ BREAK % | 66.0 | 53.5 | 61.3 | 92.4 |
| TENSILE-MODULUS, GPa | 5.4 | 5.2 | 4.9 | 5.5 |
| DYNATUP IMPACT STRENGTH, J | 2.2 | 2.4 | 1.3 | 3.6 |
| NOTCHED IZOD @ 23° C. J/m | 24.0 | 23.5 | 23.5 | 28.8 |
| UNNOTCHED IZOD @ 23° C. J/m | 577.0 | 489.0 | 407.0 | 828.0 |
| DTUFL (1.8 MPa, 2° C./min.) (unannealed) °C. | 63.8 | 65.4 | 64.8 | 65.0 |
| DTUFL (1.8 MPa, 2° C./min.) (ann. 4 hrs. @ 80° C.), °C. | 64.7 | 66.9 | 65.8 | 66.1 |

TABLE VII

Physical Properties of Alloys Consisting of Airvol-107, Airvol-205 and the Acrylic and Styrenic Copolymers: P(MMA-GAH) and P(ST-MAH).

| POLYMERS | Examples 68 | 69 | 64 | 70 |
|---|---|---|---|---|
| Airvol-107 | 90 | 90 | 80 | 70 |
| P(MMA-GAH = 91.4/8.6) | 10 | | 20 | 30 |
| P(ST-MAH = 92/8) | | 10 | | |
| PHYSICAL PROPERTIES | | | | |
| TENSILE-YIELD, MPa | 132.0 | 127.0 | 130.0 | 127.0 |
| ELONGATION @ BREAK % | 3.4 | 4.6 | 10.1 | 10.6 |
| TENSILE-MODULUS, GPa | 6.6 | 6.8 | 6.9 | 6.9 |
| DYNATUP IMPACT STRENGTH, J | 1.9 | 2.9 | 2.0 | 2.5 |
| NOTCHED IZOD @ 23° C. J/m | 24.0 | 25.6 | 21.4 | 22.4 |
| UNNOTCHED IZOD @ 23° C. J/m | 339.0 | 452.0 | 555.0 | 512.0 |
| DTUFL (1.8 MPa, 2° C./min.) (unannealed) °C. | 86.6 | 89.2 | 91.5 | 94.8 |
| DTUFL (1.8 MPa, 2° C./min.) (ann. 4 hrs. @ 80° C.), °C. | 90.9 | 92.2 | 96.4 | 96.0 |

Examples 70–81

These examples demonstrate that grafts of styrene polymers containing acid groups when grafted to a polyolefin trunk are ineffective in modifying the poly(vinyl alcohol) to improve its melt processing, as are direct grafts of acrylic acid to a polyolefin trunk.

The styrene/(meth)acrylic graft copolymers were prepared by polymerization of the appropriate monomer mixture in the presence of preformed polypropylene, mfr=4 in the absence of solvent, swelling of the polypropylene being conducted prior to initiation. The graft of MMA/N-VP (N-vinylpyrrolidone) was prepared in a similar manner.

The thermal properties of blends in the system graft polymer (polypropylene/styrene/(meth)acrylic acid)//PVOH were investigated by melt mixing in a single screw Killion extruder. The homopolymers and alloys listed in Table VII were extruded and pelletized at temperatures ranging from 180° to 200° C. for partially hydrolyzed PVOH (Airvol-205) and 200° to 216° C. for fully hydrolyzed PVOH (Airvol-107 and Airvol-325). All compositions, listed in Table VII, are given in weight percent. Examples $C_1$-$C_3$ are controls of the unmodified poly(vinylalcohols). As can be seen from the data listed in Table VII, the melt compounding of the graft terpolymers with the several poly(vinyl alcohol)s resulted in alloys which exhibited varying degrees of melt instability. The term 'UNSTABLE MELT' (Table VII) refers to the appearance of the melted PVOH or PVOH/graft terpolymer blends. 'Unstable Melt' indicates a combination of degradation, phase separation and cross linking during the melt compounding and extrusion processes. The thermal stability of the alloys, in the molten state, may qualitatively be determined from the surface texture of the extrudates. The extrudates derived from the compositions listed in Table VII range in color from pale yellow to yellowish white. The former color was observed for those compositions in which the weight percent of -MAA or AA in the graft terpolymer was less than five weight percent. Particularly, it should be noted that the absence of acid and or anhydride in the graft terpolymer, PP-g-MMA-NVP, EX. 70 of Table VII, may have contributed to the blend being of a darker hue than those blends which contain acid functionalized polypropylene graft copolymers. It was observed that all of the alloys exhibited significant amounts of melt fracture. The inhomogeneous nature of the melt was also reflected in the form of low melt viscosity which led to decrease in the extruder torque during melt processing. This decrease, in torque, may be attributed to poor mixing between the blend components. Similar observations, shown in Table VIII, were encountered when the graft copolymer (polypropylene-g-acrylic acid) (PP-g-AA) was melt compounded with PVOH (Airvol-107 and Airvol-325).

The graft copolymers are a commercial product; the exact nature of the trunk polymer or of the length of the acrylic acid grafted chains is not known.

TABLE VIII

Thermal Properties of Polymer Blends in the System: Graft Terpolymer (PP-g-ST-MAA and PP-g-ST-AA)/Airvol-107.

| EX. | POLYMER/BLEND | COMP. % (W/W) | COLOR | THERMAL STABILITY |
|---|---|---|---|---|
| C1. | Airvol-107 | 100 | YELLOW | UNSTABLE MELT |
| C2. | Airvol-325 | 100 | YELLOW | UNSTABLE MELT |
| C3. | Airvol-205 | 100 | YELLOW | UNSTABLE MELT |
| 70. | Airvol-107/(PP-g-MMA-NVP = ca. 80/19/1 | 80/20 | YELLOW | UNSTABLE MELT |
| 71. | Airvol-107/(PP-g-ST-AA = 79.5/13.6/6.8) | 80/20 | PALE YELLOW | UNSTABLE MELT |
| 72. | Airvol-107/(PP-g-ST-AA = 81.4/14.0/4.6) | 80/20 | PALE YELLOW | UNSTABLE MELT |
| 73. | Airvol-107/(PP-g-ST-MAA = 81.4/14.0/4.6) | 80/20 | PALE YELLOW | UNSTABLE MELT |

TABLE IX

Thermal Properties of Blends in the System: Graft Copolymer (PP-g-AA)/Airvol-107 and Airvol-325.

| EX. | POLYMER/BLEND | COMP. % (W/W) | COLOR | THERMAL STABILITY |
|---|---|---|---|---|
| 74. | Airvol-107/(PP-g-AA = 98/02, Mfr = 12 dg/min.) | 80/20 | PALE YELLOW | UNSTABLE MELT |
| 75. | Airvol-107/(PP-g-AA = 94/06, Mfr = 20 dg/min.) | 80/20 | PALE YELLOW | UNSTABLE MELT |
| 76. | Airvol-107/(PP-g- = 98/02, Mfr = 20 dg/min.) | 80/20 | PALE YELLOW | UNSTABLE MELT |
| 77. | Airvol-107/(PP-g-AA = 98/02, Mfr = 40 dg/min.) | 80/20 | PALE YELLOW | UNSTABLE MELT |
| 78. | Airvol-325/(PP-g-AA = 98/02, Mfr = 12 dg/min.) | 80/20 | PALE YELLOW | UNSTABLE MELT |
| 79. | Airvol-325/(PP-g-AA = 94/06, Mfr = 20 dg/min.) | 80/20 | YELLOW | UNSTABLE MELT |
| 80. | Airvol-325/(PP-g-AA = 98/02, Mfr = 20 dg/min.) | 80/20 | PALE YELLOW | UNSTABLE MELT |
| 81. | Airvol-325/(PP-g-AA = 98/02, Mfr = 40 dg/min.) | 80/20 | PALE YELLOW | UNSTABLE MELT |

Examples 82–90

These examples illustrate the utility of a multistage polymer with a butyl acrylate/acrylic acid first stage and a styrene or a styrene/methyl methacrylate second stage in improving the melt processability of poly(vinyl alcohol).

The composition delineated by Ex. 85, Table IX, represents a ternary blend comprising of a medium molecular weight (Mw=85–146k) PVOH (Airvol-325), the impact modifier of Example 82, and the acrylic terpolymer, P(MMA-NVP-MAA=73/25/02). The impact modifier of Example 82 is a multistage polymer prepared by first emulsion polymerizing butyl acrylate/ethyl acrylate/methacrylic acid (60/16/4) and then polymerizing styrene/divinylbenzene (9/1) and then styrene (10) with a low level of dodecyl mercaptan. The polymer is isolated by coagulation from emulsion. The preparation of the acrylic terpolymer in emulsion is by a process very similar to that described in Example 1.

This alloy, in addition to being 'melt stable', was found to exhibit a greater degree of toughness than a similarly prepared alloy in which the impact modifier of Example 82 is absent. The thermal properties of the alloy, Tg, Tm and percent crystallinity are comparable to that of the matrix polymer, Airvol-325. This suggests that the combined effect of the impact modifier and P(MMA-NVP-MAA=73/25/02) is the improvement of the mechanical properties of the PVOH alloy without significantly altering the thermodynamic properties of the PVOH.

TABLE X

Thermal Properties of Homopolymers and Blends in the System: Ex. 82/Airvol-107, Airvol-205 and Airvol-325.

| EX. | POLYMER/BLEND | COMP. | Mw | Tg(°C.) % w/w | Tm(°C.) | CRYS.(%) |
|---|---|---|---|---|---|---|
| C1. | Airvol-107 | 100 | 31–50k | 75.29 | 221.58 | 47.57 |
| C2. | Airvol-325 | 100 | 85–146k | 77.55 | 225.77 | 44.23 |
| C3. | Airvol-205 | 100 | 31–50k | 69.29 | 167.11 | 23.77 |
| 82. | Impact Modifier | 100 | | | | |
| 83. | Airvol-107/Ex. 82 | 80/20 | | 72.93 | 222.36 | 42.45 |
| 84. | Airvol-205/Ex. 82 | 80/20 | | 67.94 | 193.63 | 22.22 |
| 85. | Airvol-325/Ex. 82/ P(MMA-NVP-MAA = 73/25/2 | 80/4/16 | | 76.56 | 225.94 | 40.39 |

Impact modifier Example 86 is somewhat similar to the impact modifier of Example 82. It is prepared by first polymerizing 80 parts of butyl acrylate/ethyl acrylate/diallyl maleate/butylene glycol diacrylate/-methacrylic acid (74.5/20/0.4/0.1/5.0).then polymerizing 20 parts of methyl methacrylate/styrene/divinylbenzene/butylene glycol diacrylate (69/30/0.7/0.3), and isolating by coagulation.

The mechanical properties of binary and ternary blends in the system: PVOH/P(MMA-NVP-MAA)-/Ex. 86 are presented in TABLE X. It should be noted from a comparison of Examples 87 and 88 in Table X that the incorporation of the impact modifier of Example 86 into the binary blend of Airvol-107 and P(MMA-NVP-MAA) terpolymer leads to an improvement in the tensile yield strength of the final blend composition. Slight improvement is also seen in the impact property of the blend. The blend designated as Ex. 89 also shows marginal improvement in mechanical properties over that measured for blends without the impact modifier of Example 86. The blend of the low molecular weight (Mw=13-23k) fully hydrolyzed PVOH (Airvol-103) with the impact modifier of Example 86, surprisingly exhibited poor overall mechanical properties.

TABLE XI

Physical Properties of Ternary Blends in the Systems Airvol-107, Airvol-205 and Acrylic Terpolymers: P(MMA-NVP-MAA).

| POLYMERS | Examples | | | |
|---|---|---|---|---|
| | 87 | 88 | 89 | 90 |
| Airvol-107 | 85 | 78.7 | | |
| Airvol-103 | | | | 85 |
| Airvol-205 | | | 78.7 | |
| P(MMA-NVP-MAA = 70/25/5) | 15 | 13.8 | | |
| P(MMA-NVP-MAA = 73/25/2) | | | 13.8 | |
| EXAMPLE 86 | | 7.4 | 7.4 | 15 |
| PHYSICAL PROPERTY | | | | |
| SPECIFIC GRAVITY | 1.29 | 1.27 | 1.25 | 1.24 |
| TENSILE-YIELD, MPa | 0.00 | 100.94 | 78.61 | 0.00 |
| ELONGATION @ BREAK % | 2.29 | 6.70 | 127.30 | 1.12 |
| TENSILE-MODULUS, GPa | 6.42 | 5.75 | 5.10 | 5.22 |
| TENSILE-IMPACT, kJ/m2 | 101.99 | 93.79 | 219.34 | 13.59 |
| DYNATUP IMPACT STRENGTH, J | 1.82 | 2.19 | 2.96 | 1.56 |
| NOTCHED IZOD @ 0° C. J/m | 20.83 | 22.43 | 19.22 | 10.68 |
| NOTCHED IZOD @ 23°C. J/m | 18.16 | 24.56 | 22.43 | 9.61 |
| UNNOTCHED IZOD @ 23° C. J/m | | 432.01 | 504.10 | 71.56 |
| DTUFL (1.8 MPa, 2° C./min.) (unannealed) °C. | | 81.00 | 64.65 | 75.65 |
| DTUFL (1.8 MPa, 2° C./min.) (ann. 4 hrs. @ 80° C.), °C. | | 95.80 | 67.80 | 76.25 |

Examples 91–99

The examples described in TABLE XII are illustrative of the efficacy of the acrylic-modified PVOH as a hot melt adhesive. The composition of each example is given in weight percent. The particular PVOH polymers used in the examples were obtained from AIR PRODUCTS (AIRVOL) and DuPont (ELVANOL). The polymers are as follows: AIRVOL-107 is a fully hydrolyzed (98.0-98.8 mol %) resin having a solution viscosity of 5.4-6.5 cPs determined on a 4% aqueous solution at 20° C. The molecular weight of this polymer is Mw=31-50k. ELVANOL-5105 is a low solution viscosity (5-6 cPs), gel resistant, partially hydrolyzed (87-89 mol %) PVOHI resin. The acrylic terpolymer was prepared from commercially available monomers (MMA, EA and MAA) by emulsion polymerization and isolated by spray drying or coagulation.

As a comparative example, the adhesive composition, listed in TABLE I as example 91, was prepared from a powder blend, which comprised of the following ingredients: PVOH, 0.66% (based on the weight of PVOH) of a 85 weight percent $H_3PO_4$ aqueous solution, and 0.5 weight percent of Irganox-1010. The free flowing powder was melt compounded in a single screw extruder at temperatures ranging from 180°-193° C. and subsequently pelletized. The adhesiveness of the alloy was evaluated by re-melting the pellets in the extruder employed in the melt compounding step and applying the molten resin between the overlapping surface of two strips of card board to form a single lap joint. The tensile strength of the joint was tested by ASTM D3932-80 method. The strips were pulled on a Zwick tensile tester at a rate of 5.5 inches per minute. The observed adhesion is the pound force per inch (lbf/in) or Newton per meter (N/m) required to pull the lap joint apart. Example 91 demonstrates the efficacy of acid neutralized PVOH as a hot melt adhesive. However, it was observed that the thermal stability of the unmodified PVOH was inferior to that of the acrylic modified PVOH.

The adhesive compositions defined as examples 92-95 were prepared by the technique described in the comparative example, 91. They illustrate that addition of the acrylic terpolymer to the PVOH resin improves the adhesiveness of the PVOH-Acrylic alloys. The data listed in TABLE XII show a small decrease in tensile strength, compositions 92 and 93, with an increase in the level of acrylic terpolymer. Example 95 shows that an alloy comprised of equal weights of the specified acrylic terpolymer and glycerol appears to exhibit slightly higher tensile strength than alloys without glycerol.

Examples 96-99, TABLE XII, illustrate the use of hot melt adhesive compositions prepared from hot water soluble PVOH and an acrylic terpolymer. The adhesive compositions were prepared as previously described in the comparative example. The performance of compositions 96-99 was tested by the standard lap joint formation (ASTM D 3932-80) between two strips of cardboard. As can be seen from the data presented in TABLE XII, the presence of glycerol appears to improve the strength of the cardboard lap joint. The low numbers obtained for compositions 96 through 99 attest to poor bond formation, on account of the rapid crystallization of the acrylic modified PVOH alloy. It was observed that adhesion failure occurred at the substrate face in contact with the air quenched molten adhesive. The bond formed from the initial contact between the hot melt and the surface of the substrate was found to be resistant to interfacial delamination. Hence, it should be concluded that the strength of the lap joint was a function of the method of application of the hot melt.

For the purpose of comparison lap joints were prepared from a commercial hot melt adhesive and ten pairs of cardboard strips. These samples were tested by ASTM D3932-80 and an average adhesion of 65.4 lbf/inch was recorded. From TABLE XII it can be seen that the acrylic modified PVOH hot melt adhesive compositions compare favorably in adhesion with the commercial hot melt adhesive.

TABLE XII

| | Hot Melt Formulation Applied to Card Board | | | | | | | | |
|---|---|---|---|---|---|---|---|---|---|
| EXAMPLES | 91 | 92 | 93 | 94 | 95 | 96 | 97 | 98 | 99 |
| POLYMER/COMPOSITION | | | | | | | | | |
| ELVANOL-5105 | 100 | 95 | 93.5 | 90 | 87 | | | | |
| AIRVOL-107 | | | | | | 95 | 93.5 | 90 | 87 |
| GLYCEROL | 00 | 00 | 00 | 5 | 6.5 | 00 | 00 | 5 | 6.5 |
| P(MMA-EA-MAA = 81/18/01) | 00 | 5 | 6.5 | 5 | 6.5 | 5 | 6.5 | 5 | 6.5 |
| ADHESION (lbf/inch) | 54.1 | 69.5 | 65.0 | 66.6 | 71.1 | 17.0 | 23.9 | 35.8 | 37.5 |

Examples 100–101

This example illustrates the use of a poly(ethylene glycol) monomethacrylate as a component of the additive polymer. The monomer is commercially available and is not purified further; the molecular weight of the poly(ethylene glycol) is ca. 200–400, which corresponds to 5–10 —CH$_2$—CH$_2$—O— units.

A tetrapolymer of methyl methacrylate/ethyl acrylate/poly(ethylene glycol) monomethacrylate/methacrylic acid=70/18/10/2 of molecular weight 214,000 is prepared by an emulsion recipe as used in the previous examples, and isolated by spray-drying. A blend is prepared of 90 parts of a medium molecular weight super-hydrolyzed PVOH, commercially designated ELVANOL (®) 90-50, and 10 parts of the tetrapolymer; a control is prepared in a similar manner without the tetrapolymer. This PVOH is highly crystalline and requires high processing temperatures to convert to a melt.

In a high/intensity Welex/Henschel mixture heated to 37° C. is added the PVOH granules and agitated at 800–900 RPM for 5 minutes. The stirring is stopped and phosphoric acid, 0.66 parts based on PVOH, which is 0.6 parts based on the blend of the two polymers, is added, and mixing at 400–450 rpm is recommenced for 10 minutes. The stirring is again stopped, the second polymer in powder form is added, and the mix is again agitated at 400–450 rpm for 5 minutes. The free-flowing powder is collected in polyethylene bags.

The blend (Example 100), along with the non-modified PVOH control (Example 101), is then melt-processed in a single screw Killion extruder at 80 rpm. with extruder barrel settings of 398° C., 418° C., and 418° C., and die settings of 400° C., and 410° C. The extrudate of the blend is pelletized. The unmodified PVOH could not be processed into pellets.

The blend could be re-extruded into a thin, flexible film which exhibited less crinkling noise when flexed than films of similar composition but wherein the additive did not contain the poly(ethylene glycol) monomethacrylate.

The thermal stability of the Henschel mixed polymers is measured by thermogravimetric analysis for weight loss at 250° C. for 1 hour under nitrogen. The samples are pre-dried in a vacuum oven under nitrogen. The blend lost 9.8 weight percent; the unmodified PVOH lost 49.6 weight percent.

I claim:

1. A melt-processed polymeric blend comprising:
   a) from about 80 to about 98 parts of a first polymer containing at least about 95 mol % units of the structure

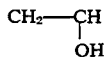

and optionally units selected from one or more of the following structures:

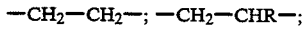

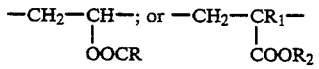

wherein R is alkyl, R$_1$ is H or CH$_3$, and R$_2$ is an alkyleneoxy group; and
   b) from about 2 to about 20 parts of a second polymer containing
      (i) from about 70 to about 93 weight percent of one or more units of the structure

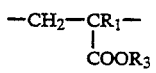

where R$_3$ is lower alkyl of from 1 to 4 carbon atoms, and
      (ii) from about 2 to about 10 weight percent of one or more units derived from an unsaturated copolymerizable carboxylic acid or anhydride, wherein the second polymer contains no units derived from a vinyl amide or vinyl cyclic amide monomer, and wherein the second polymer further contains from 5 to 28 weight percent of units derived from at least one of

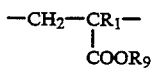
      (a)

wherein R$_9$ is an alkyl group of 5 to 20 carbon atoms,

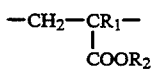
      (b)

wherein R$_2$ is an alkeneoxy group, i.e., of the structure

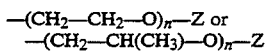

where n is from 1 to 30, and Z is H or C$_1$ to C$_8$ alkyl,
   (c) a vinyl ester, a vinyl aromatic monomer, glycidyl methacrylate, acrylonitrile, or methacrylonitrile.
2. The blend of claim 1 wherein R$_1$ is —CH$_3$, n is 4 to 20, and Z is H.
3. The blend of claim 2 wherein the second polymer contains no units chosen from monomers of groups (ii)(a) or (ii)(c).

* * * * *

UNITED STATES PATENT AND TRADEMARK OFFICE
CERTIFICATE OF CORRECTION

PATENT NO. : 5,389,724

DATED : February 14, 1995

INVENTOR(S) : Edward E. LaFleur

It is certified that error appears in the above-identified patent and that said Letters Patent is hereby corrected as shown below:

In Claim No. 1, Column 38 Line 13, the formula should be centered on the page:

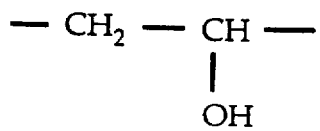

In Claim No. 1, Column 38 Line 18, the formula should be centered on the page:

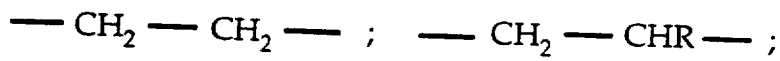

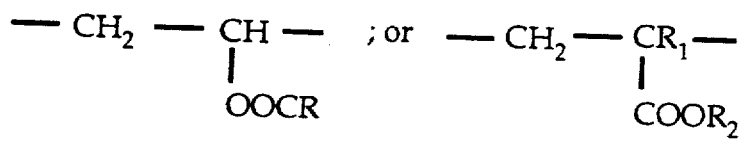

UNITED STATES PATENT AND TRADEMARK OFFICE
CERTIFICATE OF CORRECTION

PATENT NO. : 5,389,724

DATED : February 14, 1995

INVENTOR(S) : Edward E. LaFleur

It is certified that error appears in the above-indentified patent and that said Letters Patent is hereby corrected as shown below:

In Claim No. 1, Column 38, Line 30, the formula should be centered on the page:

$$-CH_2-CR_1- \atop \phantom{-CH_2-}COOR_3$$

Signed and Sealed this

Twenty-third Day of May, 1995

Attest:

BRUCE LEHMAN

Attesting Officer     Commissioner of Patents and Trademarks